(12) United States Patent
Ward et al.

(10) Patent No.: US 7,202,328 B2
(45) Date of Patent: Apr. 10, 2007

(54) AMORPHOUS POLYMER ARTICLE

(75) Inventors: Ian M Ward, Leeds (GB); Peter J Hine, Leeds (GB)

(73) Assignee: BTG International Limited, London (GB)

(*) Notice: Subject to any disclaimer, the term of this patent is extended or adjusted under 35 U.S.C. 154(b) by 50 days.

(21) Appl. No.: 10/480,830

(22) PCT Filed: Jun. 14, 2002

(86) PCT No.: PCT/GB02/02725

§ 371 (c)(1),
(2), (4) Date: Apr. 23, 2004

(87) PCT Pub. No.: WO02/102568

PCT Pub. Date: Dec. 27, 2002

(65) Prior Publication Data

US 2004/0169304 A1    Sep. 2, 2004

(30) Foreign Application Priority Data

Jun. 15, 2001  (GB) ................... 0114669.5

(51) Int. Cl.
*C08F 6/00* (2006.01)
(52) U.S. Cl. ............... 528/480; 264/411.1; 428/176.1; 428/219
(58) Field of Classification Search ............ 264/176.1, 264/219; 428/411.1; 528/480
See application file for complete search history.

(56) References Cited

U.S. PATENT DOCUMENTS

| 3,997,386 A | 12/1976 | Oshida et al. |
| 4,243,368 A | 1/1981 | Garabeidian |
| 4,414,266 A | 11/1983 | Archer et al. |
| 4,971,642 A | 11/1990 | Schwan |
| 5,110,682 A | 5/1992 | Bonazza |
| 5,628,946 A | 5/1997 | Ward et al. |

FOREIGN PATENT DOCUMENTS

| EP | 0 875 374 A2 | 11/1998 |
| JP | 52114877 A | 10/1978 |
| JP | 55002060 A | 1/1980 |
| JP | 63194919 A | 8/1988 |
| JP | 2000/143783 A | 5/2000 |
| RU | SU870161 A | 10/1981 |

*Primary Examiner*—Terressa Boykin
(74) *Attorney, Agent, or Firm*—Nixon & Vanderhye

(57) ABSTRACT

Method of producing an article comprising providing a raw material in the form of a plurality of polymer elements, the polymer elements comprising an amorphous polymer; heating the materials to a temperature above a first predetermined temperature; and compacting the material whilst above the first predetermined temperature. The first predetermined temperature is the Tg of the polymer elements, the pressure is between 100 and 200 psi; and the temperature and pressure of compaction are sufficient to soften the outer portion of the polymer elements and to cause the polymer elements to bonds to each other without melting or softening of the inner portion of polymer elements. A product is produced having a structure which comprises cores of amorphous polymer that have not been softened or melted in the method, surrounded by a mass of softened and re-hardened material which bonds the cores together.

16 Claims, 24 Drawing Sheets

| number | number of layers | temperature outside(C) | temperature inside(C) | pressure(psi) | total time | dwell time | cooling time | rubber |
|---|---|---|---|---|---|---|---|---|
| 1 | 2 | | 130(max 130.7) | 100 | 12min | 30s | 5min30s | no |
| 2 | 4 | | 135(max 135.4) | 100 | 14min | 1min30s | 7min30s | no |
| 3 | 4 | | 140(max 140.5) | 100 | 29min | 3min30s | 3min30s | no |
| 4 | 4 | | 145(max 145.5) | 100 | 36min | 3min30s | 3min30s | no |
| 5 | 4 | | 150(max 151.1) | 100 | 25min30s | 3min30s | 6min30s | no |
| 6 | 4 | | 150 | 100 | 23min30s | 6min | 3min30s | yes+steel |
| 7 | 4 | | 155 | 100 | 9min | | | yes |
| 8 | 4 | | 150(max 150.9) | 400 | 29min30s | 5min | 4min | yes |
| 9 | 4 | | 160(max 160.4) | 550 | 30min30s | 6min | 6min | yes |
| 10 | 4 | | 170(max 170.5) | 400 | 29min30s | 5min | 8min | yes |
| 11 | 4 | | 165(max 165.3) | 400 | 27min30s | 5min | 4min30s | yes |
| 12 | 4 | | 155 | 400 | 18min30s | 5min | 3min30s | yes |
| 13 | 4 | | 158(max 158.1) | 400 | 36min | 7min | 4min30s | yes |
| 14 | 4 | | 162(max 162.7) | 400 | 31min | 6min | 5min | yes |
| 15 | 4 | 155.1 | 157.3 | 400 | 37min30s | 5min | 4min30s | yes |

Hot-compaction: first program

General conditions: 4 layers, 5 inches square, 400psi, rubber

| Number of the sample | First rate (C) | Dwelt time | Second rate (C) | Dwell time | Cooling time | Total time | Temperature inside (C) | Temperature outside (C) |
|---|---|---|---|---|---|---|---|---|
| 16 | 70-135 10C/min | 5min | 135-152 1C/min | 5min | 5min30 | 38min | 150 (max 150.3) | 152 (max 153.1) |
| 17 | 70-135 10C/min | 5min | 135-157 1c/min | 5min | 9min30 | 42min 30 | 155 (max 155) | 157 (max 158.4) |
| 18 | 70-135 10C/min | 5min | 135-160 1C/min | 5min | 5min | 46min 30 | 158 (max 158.5) | 160 (max 161) |
| 19 | 70-135 10C/min | 5min | 135-162 1C/min | 5min | 5min30 | 48min | 160 (max 159.6) | 162 (max 162.2) |
| 20 | 70-140 10C/min | 5min | 140-157 1C/min | 5min | 5min | 38min | 155 (max 155) | 157 (max 156.8) |
| 21 | 70-143 10C/min | 5min | 143-160 1C/min | 5min | 4min30 | 38min 30 | 158 (max 157.8) | 160 (max 161) |
| 22 | 70-145 10C/min | 5min | 145-162 1C/min | 5min | 4min30 | 42min 30 | 160 (max 160.1) | 162 (max 162.8) |
| 23 | 70-147 10C/min | 5min | 147-164 1C/min | 5min | 5min30 | 40min | 162 (max 162.7) | 164 (max 164.7) |
| 24 | 70-150 10C/min | 5min | 150-167 1C/min | 5min | 5min | 39min 30 | 165 (max 165.1) | 167 (max 168) |
| 25 | 70-155 10C/min | 5min | 155-172 1C/min | 5min | 5min | 40min | 170 (max 170) | 172 (max 173.2) |

Description of the samples

| Number of the sample | program | Temperature (C) | Pressure (psi) | Dwell time | Cooling time | Total time |
|---|---|---|---|---|---|---|
| 26 | First ramp: 70-140C rate 10C/min Dwelt time 5min Second ramp: 140-157C rate 1C/min Dwelt time 30min | 153.6 | 200 | 20min | 5min | 64min |
| 27 | First ramp: 70-140C rate 10C/min Dwelt time 5min Second ramp: 140-157C rate 1C/min Dwelt time 30min | 154 | 400 | 27min | 9min | 68min |
| 28 | no | 155 | 400 | 5min30 | 7min | 30min30s |
| 29 | First ramp: 70-140C rate 10C/min Dwelt time 3min Second ramp: 140-158C rate 1C/min Dwelt time 5min | 155 | 400 | 2min30 | 5min | 32min |

FIG. 5

| Number of the sample | Second program | Final temperature inside (C) | Pressure (psi) | Total time | Cooling time | Range of temperature during the last dwelt time |
|---|---|---|---|---|---|---|
| 30 | First ramp: 70-153C rate: 10Cmin Dwelt time: 3min Second ramp: 153-158C rate: 1Cmin Dwelt time: 5min | 155 (maximum: 155) | 400 | 31min30s | 7min | temperature at the beginning: 152.5, we hold the program till the temperature rose 155C and then 5 minutes dwelt time |
| 31 | First ramp: 70-153C rate: 10Cmin Dwelt time: 5min Second ramp: 153-158C rate: 1Cmin Dwelt time: 5min | 155 (maximum: 156.4) | 400 | 29min | 6min | 153.8-156.4 |
| 32 | First ramp: 70-153C rate: 10Cmin Dwelt time: 5min Second ramp: 153-158C rate: 1Cmin Dwelt time: 5min | 155 (maximum: 155.4) | 400 | 30min | 7min | 153.1-155.4 |
| 33 | First ramp: 70-158C rate: 10Cmin Dwelt time: 5min Second ramp: 158-163C rate: 1Cmin Dwelt time: 5min | 160 (maximum: 161) | 400 | 30min30s | 6min30s | 158.7-161 |
| 34 | First ramp: 70-163C rate: 10Cmin Dwelt time: 5min Second ramp: 163-168C rate: 1Cmin Dwelt time: 5min | 165 (maximum: 166.3) | 400 | 30min30s | 6min30s | 164.5-166.3 |
| 35 | First ramp: 70-168C rate: 10Cmin Dwelt time: 5min Second ramp: 168-173C rate: 1Cmin Dwelt time: 5min | 170 (maximum: 171) | 400 | 31min | 6min30 | 168.5-171 |
| 36 | First ramp: 70-140C rate: 10Cmin Dwelt time: 5min Second ramp: 140-157C rate: 1Cmin Dwelt time: 5min | 155 (maximum: 155) | 400 | 41min | 6min30 | 152.8-155 |

FIG. 6

*Preparation of the samples made at 160C (2inches):*

| Number of the sample | Temperature (C) | Pressure (psi) | Total time | Dwell time | Cooling time | Cooling rate (C/min) |
|---|---|---|---|---|---|---|
| 37 | 160 (max: 161.6) | 400 | 9min | Straight cooling | 5min30 | 16 |
| 38 | 160 (max: 162.2) | 400 | 9min30 | Straight cooling | 5min | 19.5 |
| 39 | 160 (max: 160.7) | 400 | 31min30s | 9min30s | 4min30s | 19 |
| 40 | 160 (max: 160.3) | 400 | 49min | 10min | 20min30s | 5 (program) |

FIG. 7

*Description of the samples made at higher temperature (400psi)*

| Number of the sample | Temperature (C) | program | Total time | Dwell time | Cooling time |
|---|---|---|---|---|---|
| 41 | 179.5 | First ramp: 70-165, rate: 10C/min<br>Dwell time: 5min<br>Second ramp: 165-182, rate 1C/min<br>Dwell time: 5min | 47min | 3min30s | 11min |
| 42 | 189.5 | First ramp: 70-165, rate: 10C/min<br>Dwell time: 5min<br>Second ramp: 165-182, rate 1C/min<br>Dwell time: 5min | 46min | 3min30s | 8min30s |
| 44 | 200 | First ramp: 70-185, rate: 10C/min<br>Dwell time: 5min<br>Second ramp: 185-202, rate 1C/min<br>Dwell time: 5min | 46min30s | 3min30s | 8min |

FIG. 8

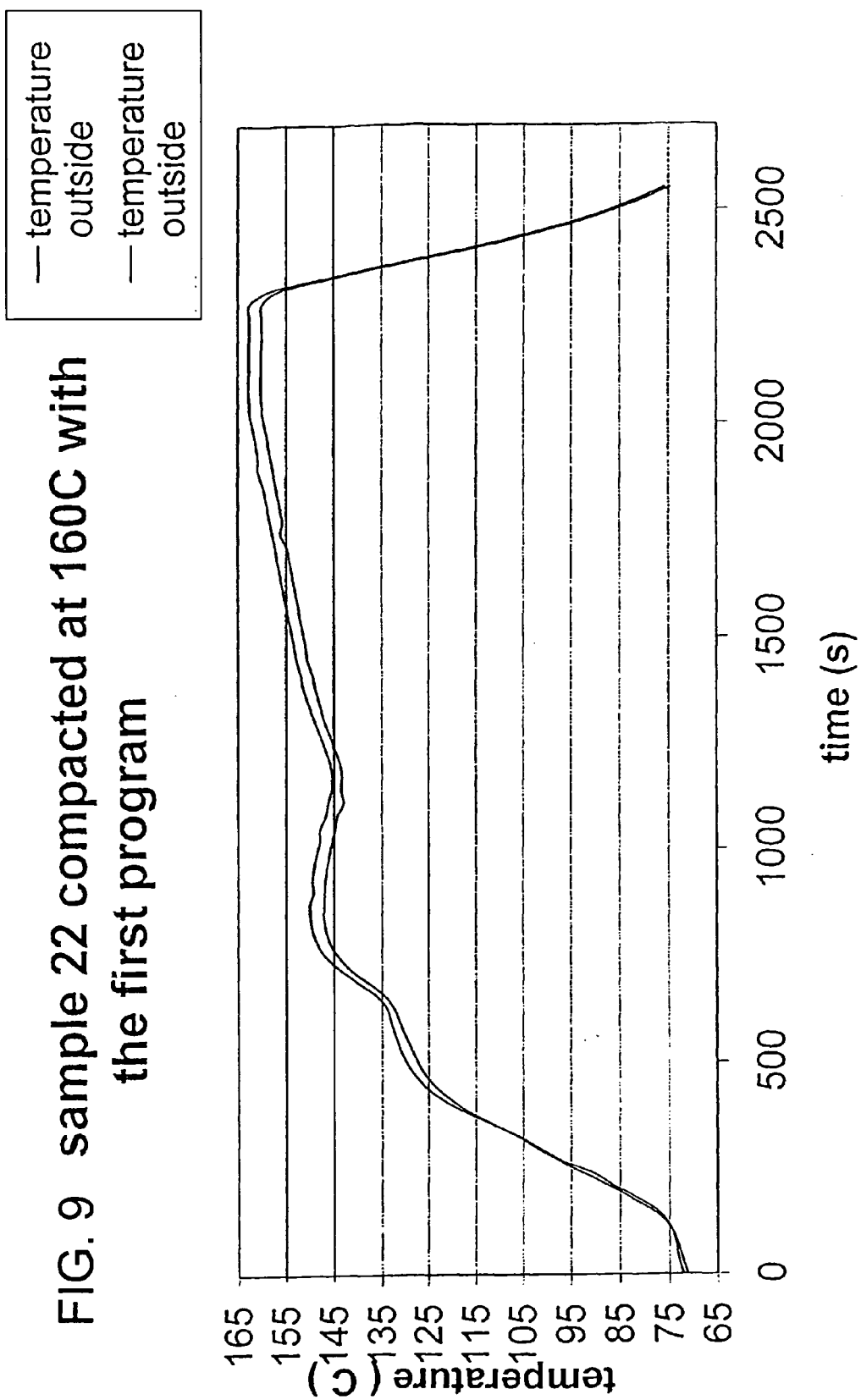
FIG. 9 sample 22 compacted at 160C with the first program

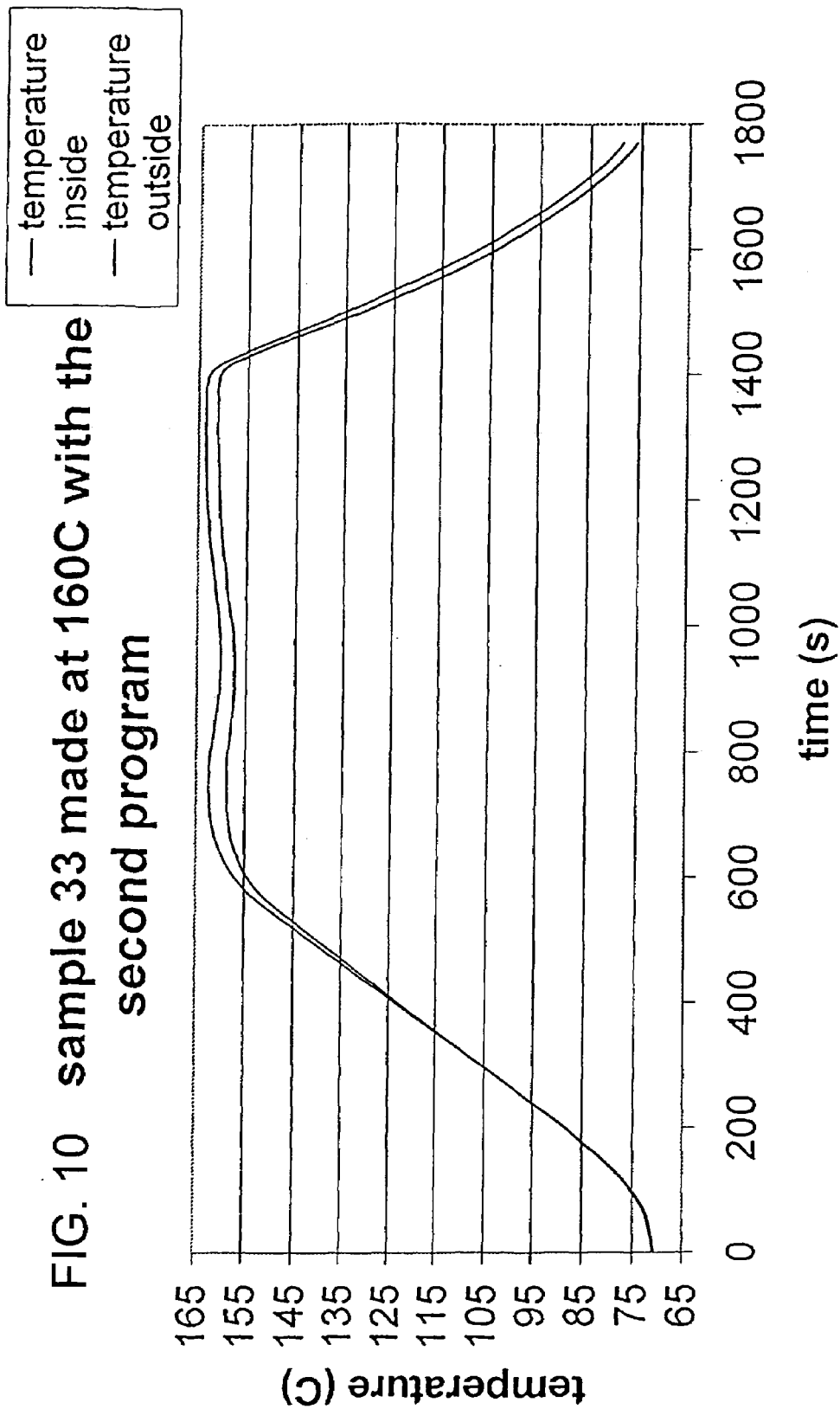
FIG. 10 sample 33 made at 160C with the second program

FIG. 11 Tensile results

| Number of the sample | Temperature (C) | Thickness (mm) | Width (mm) | Modulus (GPa) | | | | Average modulus (GPa) | Standard deviation | Final strength (MPa) |
|---|---|---|---|---|---|---|---|---|---|---|
| 16 | 150 | 0.495 | 3.992 | 3.270 | 3.133 | 2.882 | | 3.095 | 0.215 | 48.2 |
| 20 | 155 | 0.497 | 3.997 | 2.297 | 2.356 | 2.568 | | 2.407 | 0.161 | 50.2 |
| 21 | 158 | 0.487 | 3.988 | 2.865 | 2.827 | 3.008 | | 2.900 | 0.108 | 47.4 |
| 23 | 162 | 0.480 | 3.992 | 2.888 | 2.514 | 2.672 | | 2.691 | 0.197 | 47.6 |
| 25 | 170 | 0.499 | 4.004 | 2.611 | 2.814 | | | 2.713 | 0.102 | 49 |

FIG. 12

| Number of the sample | area | Thickness s (mm) | Large (mm) | Modulus (GPa) | | | | Average modulus (GPa) | Standard deviation | Final strength (MPa) |
|---|---|---|---|---|---|---|---|---|---|---|
| 26 | Smooth part | 0.499 | 3.993 | 3.575 | 3.750 | 3.624 | | 3.650 | 0.100 | 47 |
| | Rough part | 0.628 | 4.007 | 1.557 | 1.493 | 1.540 | | 1.530 | 0.037 | 34.5 |
| 27 | Smoother and darker part | 0.473 | 4.008 | 3.659 | 3.483 | 3.222 | | 3.455 | 0.233 | 43 |
| | Rougher part | 0.611 | 4.041 | 1.900 | 1.890 | 1.842 | | 1.877 | 0.035 | 42.5 |
| 28 | Clearer part | 0.488 | 4.012 | 4.442 | 3.679 | | | 4.061 | | 40 |
| | Rougher part | 0.575 | 3.995 | 1.964 | 1.982 | 1.935 | | 1.960 | 0.025 | 40.5 |
| 29 | Clearer part | 0.506 | 4.016 | 3.601 | 3.779 | 4.009 | | 3.796 | 0.213 | 52.40 |
| | Darker part | 0.533 | 4.012 | 3.919 | 3.025 | 2.814 | | 2.919 | 0.106 | 43.6 |

*Tensile experiments*

| Number of the sample | Temperature (C) | area | Thickness (mm) | Width (mm) | Modulus (GPa) | | | | Average modulus | Standard deviation | Final strength (Mpa) |
|---|---|---|---|---|---|---|---|---|---|---|---|
| 32 | 155 | I | 0.498 | 3.973 | 2.675 | 2.765 | 2.775 | | 2.738 | 0.063 | 42.5 |
|  |  | II | 0.491 | 3.969 | 2.870 | 2.704 | 2.630 | | 2.735 | 0.135 | 47 |
|  |  | III | 0.495 | 4.005 | 2.776 | 2.762 | 2.718 | | 2.752 | 0.034 | 51 |
|  |  | IV | 0.500 | 4.008 | 3.597 | 3.562 | 3.431 | | 3.530 | 0.099 | 46 |
| 33 | 160 | I | 0.484 | 4.012 | 2.471 | 2.576 | 2.581 | | 2.543 | 0.072 | 46.5 |
|  |  | II | 0.501 | 3.955 | 2.533 | 2.593 | 2.434 | | 2.520 | 0.086 | 45 |
|  |  | III | 0.490 | 4.008 | 2.250 | 2.316 | 2.412 | | 2.326 | 0.086 | 44.5 |
|  |  | IV | 0.485 | 4.019 | 3.375 | 3.633 | 3.468 | | 3.492 | 0.141 | 45.5 |
| 34 | 165 | I | 0.492 | 3.997 | 2.842 | 2.822 | 2.786 | | 2.817 | 0.031 | 49 |
|  |  | II | 0.496 | 4.008 | 2.844 | 2.658 | 2.800 | | 2.767 | 0.077 | 48 |
|  |  | III | 0.546 | 4.032 | 2.393 | 2.379 | 2.495 | | 2.422 | 0.073 | 44 |
|  |  | IV | 0.489 | 4.064 | 2.460 | 2.465 | 2.510 | | 2.478 | 0.032 | 49.4 |
| 35 | 170 | I | 0.479 | 4.017 | 2.641 | 2.663 | 2.472 | | 2.592 | 0.120 | 52.9 |
|  |  | II | 0.486 | 4.050 | 2.505 | 2.615 | 2.590 | | 2.570 | 0.065 | 51.1 |
|  |  | III | 0.478 | 4.028 | 2.545 | 2.758 | 2.547 | | 2.617 | 0.141 | 53.7 |
|  |  | IV | 0.472 | 4.009 | 2.997 | 2.894 | 2.996 | | 2.962 | 0.068 | 53.2 |
| 36 | 155 | I | 0.510 | 3.986 | 2.460 | 2.561 | 2.530 | | 2.517 | 0.057 | 42 |
|  |  | II | 0.494 | 3.992 | 2.505 | 2.535 | 2.661 | | 2.567 | 0.094 | 43.8 |
|  |  | III | 0.475 | 3.992 | 2.400 | 2.701 | 2.581 | | 2.561 | 0.161 | 51.3 |
|  |  | IV | 0.487 | 3.988 | 2.550 | 2.705 | 2.798 | | 2.684 | 0.134 | 49.1 |

FIG. 13

| Number of the sample | Temperature (C) | Average modulus (GPa) | Standard deviation | Final strength (MPa) | Standard deviation |
|---|---|---|---|---|---|
| 32 | 155 | 2.939 | 0.591 | 46.6 | 4.4 |
| 33 | 160 | 2.720 | 0.772 | 45.4 | 1.1 |
| 34 | 165 | 2.621 | 0.199 | 47.6 | 3.6 |
| 35 | 170 | 2.685 | 0.277 | 52.7 | 1.6 |

FIG. 14

| Number of the sample | area | Thickness (mm) | Width (mm) | Modulus (GPa) | | | Average modulus (GPa) | Standard deviation | Final strength (MPa) | Standard deviation |
|---|---|---|---|---|---|---|---|---|---|---|
| 41 | Inside (I) | 0.489 | 4.003 | 2.622 | 2.935 | 3.018 | 2.858 | 0.236 | 54 | |
| | Outside (II) | 0.566 | 3.966 | 2.702 | 2.571 | 2.603 | 2.625 | 0.077 | 48.4 | |
| 42 | Inside (I) | 0.473 | 4.014 | 2.639 | 2.710 | 2.672 | 2.674 | 0.036 | 57.6 | |
| | Outside (II) | 0.473 | 4.013 | 2.857 | 2.878 | 2.822 | 2.852 | 0.030 | 58 | |

FIG. 15

| Number of the sample | Temperature (C) | Modulus (GPa) | Final strength (MPa) |
|---|---|---|---|
| 41 | 180 | 2.742 | 51.2 |
| 42 | 190 | 2.763 | 57.8 |

FIG. 16

| Number of the sample | Temperature (C) | Average load I (N) | Average load II (N) | Average load (N) |
|---|---|---|---|---|
| 16 | 150 | 1.329 | | 1.329 |
| 20 | 155 | 2.879 | 2.453 | 2.666 |
| 21 | 158 | 4.801 | 3.092 | 3.947 |
| 22 | 160 | 2.155 | 4.167 | 3.161 |
| 23 | 162 | 3.038 | 5.49 | 4.264 |
| 24 | 165 | | 4.593 | 3.493 |
| 25 | 170 | 8.032 | | 8.032 |

FIG. 17

| Number of the sample | Dwelt time (min) | area | Minimum load (N) | Average load (N) | Peel strength (N/mm) |
|---|---|---|---|---|---|
| 27 | 27 | I | 4.407 | 4.399 | 0.5498 |
| | | II | 3.713 | 3.757 | 0.4696 |
| | | III | 2.854 | 2.930 | 0.3663 |
| 29 | 2min30 | I | 3.119 | 3.498 | 0.4372 |
| | | II | 1.332 | 1.569 | 0.1961 |

| Number of the sample | Dwelt time (min) | Average load (N) | Peel strength (N/mm) |
|---|---|---|---|
| 27 | 27 | 3.695 | 0.4619 |
| 29 | 2min30 | 2.534 | 0.3167 |

FIG. 20

| Number of the sample | Temperature (C) | reference | minimum load (N) | average load (N) | peel strength (N/mm) |
|---|---|---|---|---|---|
| 32 | 155 | I | 3.48 | 3.841 | 0.4822 |
|  |  | II | 3.919 | 4.261 | 0.5326 |
|  |  | III | 3.893 | 4.197 | 0.5247 |
| 33 | 160 | I | 2.528 | 2.823 | 0.3529 |
|  |  | II | 2.297 | 2.645 | 0.3306 |
|  |  | III | 3.153 | 3.633 | 0.4541 |
| 34 | 165 | I | 3.954 | 4.361 | 0.5451 |
|  |  | II | 2.555 | 2.948 | 0.3685 |
|  |  | III | 2.12 | 2.633 | 0.3291 |
| 35 | 170 | I | 3.751 | 4.215 | 0.5269 |
|  |  | II | 4.016 | 4.568 | 0.571 |
|  |  | III | 3.525 | 3.704 | 0.463 |

FIG. 21

| number of the sample | temperature (C) | average load (N) | average peel strength (N/mm) |
|---|---|---|---|
| 32 | 155 | 4.01 | 0.5132 |
| 33 | 160 | 3.03 | 0.3792 |
| 34 | 165 | 2.04 | 0.4142 |
| 35 | 170 | 4.16 | 0.5203 |

| Number of the sample | area | Minimum load (N) | Average load (N) | Peel strength (N/mm) |
|---|---|---|---|---|
| 38 | I | 3.684 | 4.259 | 0.5324 |
|  | II | 2.445 | 3.263 | 0.4078 |
| 39 | I | 3.093 | 3.483 | 0.4353 |
|  | II | 3.098 | 3.193 | 0.3991 |
| 40 | I | 4.735 | 5.042 | 0.6303 |
|  | II | 2.908 | 3.333 | 0.4166 |

FIG. 22

| Number of the sample | Average load (N) | Peel strength (N/mm) |
|---|---|---|
| 38 | 3.972 | 0.4701 |
| 39 | 3.338 | 0.4172 |
| 40 | 2.729 | 0.5235 |

FIG. 23

| Number of the sample | Temperature (C) | Minimum load (N) | Maximum load (N) | Average load (N) | Peel strength (N/mm) |
|---|---|---|---|---|---|
| 41 | 180 | 4.165 | 15.81 | 6.320 | 0.7899 |
| 42 | 190 | 9.197 | 21.83 | 12.83 | 1.604 |

FIG. 24

FIG. 33
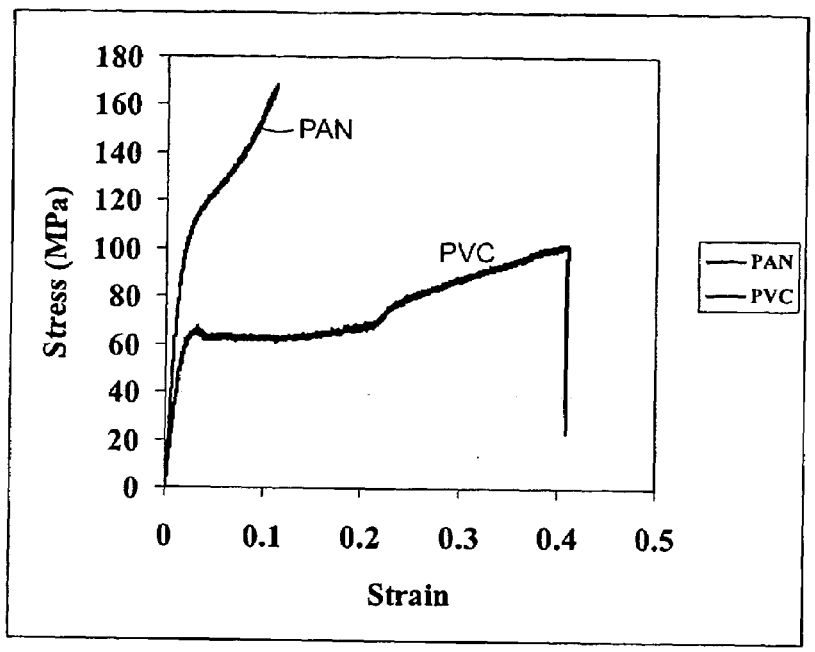
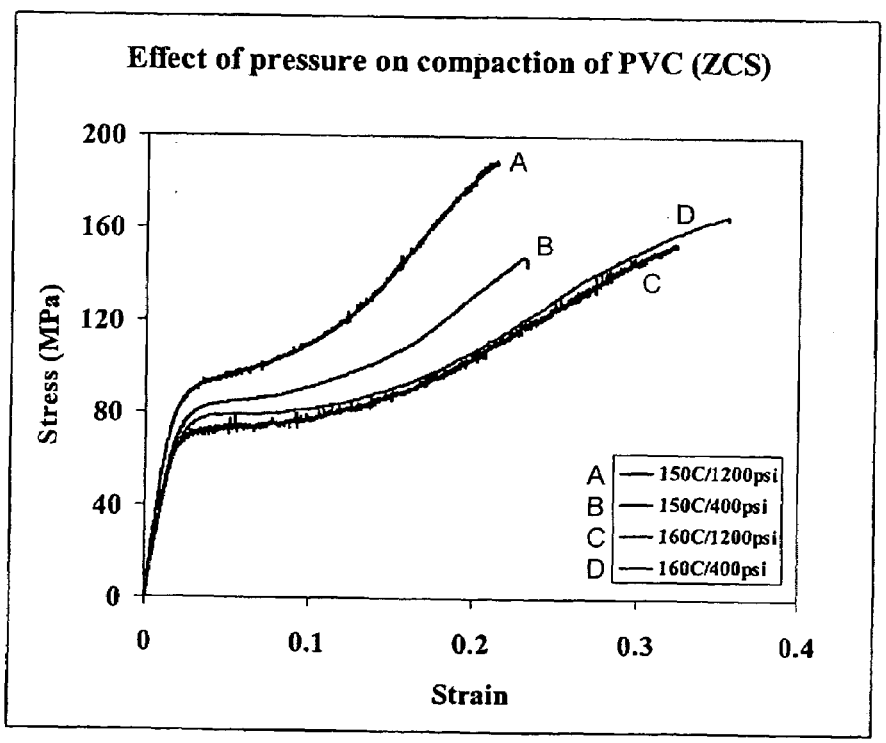
FIG. 34

AMORPHOUS POLYMER ARTICLE

This application is the U.S. National Phase of International Application PCT/GB02/02725, filed 14 Jun. 2002, which designated the U.S..

The present invention relates to amorphous polymer articles and relates particularly, but not exclusively, to a method of producing such an article and an article comprising a hot compaction of amorphous polymer material.

BACKGROUND OF THE INVENTION

Hot compaction is a process which is well-known for use with semi-crystalline and crystalline polymer materials such as polypropylene and the like and is disclosed in U.S. Pat. No. 5,628,946. During a heating step, a small portion of the surface of the polymer strand melts and during subsequent cooling re-crystallises in a different form from that of the initial material in a manner which facilitates bonding of the fibres to each other. Typically, several layers of the material are placed in a mould and then heated and pressed at a predetermined pressure for a predetermined period of time before being cooled and then removed from the mould. The specific temperatures, pressures and dwell times associated with the hot-compaction of particular polymer materials are normally determined by experimentation for each individual product. However, in each case the temperature pressure and dwell time will be sufficient to allow melting and inter-bonding of the outer layers of the polymer strands without destroying the properties of the core of each strand and the pressure will be sufficient to cause plastic flow of any softened material so as to encourage good bonding between adjacent polymer strands. It is important to appreciate that one should not over heat the polymer material as to do so might result in a final product which is of less than optimal performance.

The production of polymer articles by hot-compaction has, until now, been confined to crystalline or semi-crystalline polymers as such polymers have easily defined and distinct melting temperatures and it is, therefore, possible to accurately define a temperature and dwell time during which the outer surface of the polymer strands will melt and bond to each other whilst the inner core remains unaltered. Amorphous polymer materials do not have a specific and easily defined melting temperature but have what is known as a "glass temperature" "Tg" which is a temperature at and above which the polymer progressively softens and becomes more pliable without actually melting in the manner of crystalline or semi-crystalline materials. The particular glass temperature (Tg) for each amorphous polymer will vary depending on the particular material and also on the temperature of polymerisation.

SUMMARY OF THE INVENTION

We have now found that, surprisingly to us and quite unexpectedly in the light of the earlier work described above, amorphous polymer fibres can be compacted into monolithic articles by hot-compaction techniques whilst retaining a structure comprising cores of polymer material of un-softened form surrounded by a mass of softened and re-crystallised polymer material which bonds the fibres together. Additionally, other advantageous properties such as transparency can be achieved and this is in contrast with crystalline or semi-crystalline materials.

Accordingly, the present invention provides a method of producing an article comprising the steps of:

a) providing a raw material in the form of a plurality of polymer elements;
b) heating said material to above a first predetermined temperature; and
c) compacting said material whilst above said first predetermined temperature, characterised in that:
said raw material comprises an amorphous polymer and said temperature and pressure of compaction are sufficient to cause the polymer elements to bond to each other without melting of the inner portion of one or more of the elements.

Preferably, the predetermined temperature comprises a temperature a predetermined value above the Tg temperature of the polymer.

Advantageously, the pressure and temperature of compaction are maintained for a predetermined period of time.

Preferably, the temperature is between 125° C. and 190° C. and is preferably between 135° C. and 150° C.

Advantageously, the pressure of compaction is in the region of up to 100 psi.

In a particular arrangement the temperature is preferably between 150° C. and 190° C. In one arrangement the pressure of compaction may be up to 400 psi.

According to a particular arrangement of the present invention there is provided a method as described above and further including the steps of (i) raising the temperature from a first, lower, temperature to a second, higher, temperature at a first rate over a first period of time,
(ii) holding the temperature at said second temperature for a second period of time;
(iii) raising the temperature from the second temperature to a third, higher, temperature at a second rate over a third period of time;
(iv) holding the temperature at said third temperature for a further period of time; and
(v) reducing the temperature from said third temperature in accordance with a predetermined cooling strategy.

In a particular method the following more specific steps may be incorporated:

(i) the temperature is increased to a second temperature of 135° C. at 10° C./min;
(ii) the second temperature is held for between 5 minutes;
(iii) the temperature is increased to a third temperature of 152° C. at approximately 1° C./min;
(iv) the third temperature is held for between 5 minutes and 27 minutes; and
(v) the temperature is then returned to a lower (room) temperature in accordance with the predetermined cooling strategy.

In a simplified arrangement the following steps may be used:

(i) applying the compaction pressure to the assembly;
(ii) raising the temperature from a first, lower, temperature to a compaction temperature;
(iii) holding the temperature at the compaction temperature for a period of time; and
(iv) reducing the temperature from the compaction temperature in accordance with the predetermined cooling strategy.

In a specific example of the simplified arrangement the pressure applied in step (i) is in the region of 2.8MPa (400 psi to the assembly); the temperature is increased to 152° C. which is held for between 5 and 27 minutes before returning to room temperature in accordance with a predetermined cooling strategy.

In a particularly advantageous arrangement the material comprises polyvinyl chloride PVC).

In some arrangements it may be possible to combine amorphous and crystalline polymers together in order to produce a finished article with specific material properties.

Also claimed in the present application is an article manufactured in accordance with any of the above-mentioned method steps.

The present invention also provides an article comprising a hot compaction of amorphous polymer material.

The amorphous polymer material preferably comprises filaments/elements which are bonded to each other by means of the application of an elevated temperature and pressure.

Advantageously, the article comprises soft bonded elements of amorphous polymer material.

BRIEF DESCRIPTION OF THE DRAWINGS

The present invention will now be more particularly described by way of example only with reference to the accompanying drawings in which:

FIGS. 3 to 24 are tables of various results discussed later herein;

FIG. 33 shows the stress-strain graph for PAN and PVC;

FIG. 34 shows the effect of pressure on compaction of PVC (ZCS);

DETAILED DESCRIPTION OF PREFERRED EMBODIMENTS

Figure 1:
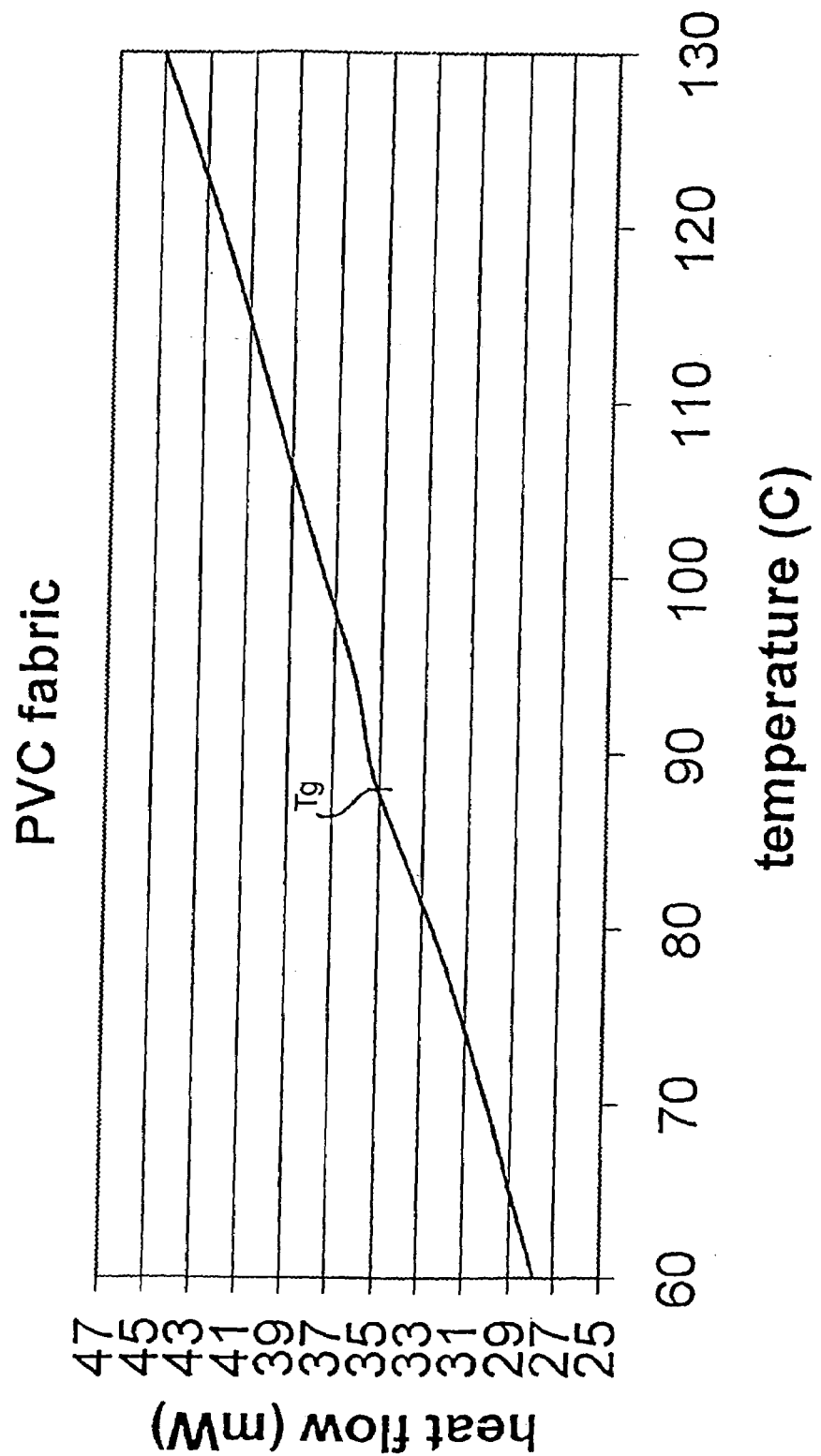
FIG. 1 illustrates the Tg temperature of PVC fabric.

In our earlier patent published under U.S. Pat. No. 5,628,946 we disclose a novel process whereby an assembly of crystaline fibres of oriented polymer may be hot compressed to form a sheet having superior mechanical properties particularly in the direction transverse to that in which the fibres are aligned. It has now been found that this process can be extended to materials formed from polymers having an amorphous structure and this patent application relates to such materials and employs such methods.

The process of U.S. Pat. No. 5,628,946 is distinguished from those of EPA 116845 by an initial processing step in which the fibres are brought to and held at the compaction temperature whilst subject to a pressure sufficient to maintain the fibres in contact. In the processes of this invention the compaction temperature does influence the mechanical properties of the compacted product. In the processes of this invention a proportion of the polymer material in the fibres melts and subsequently recrystallises and it is (his melt phase which serves to bind the fibres together. An assembly of oriented polymer fibres is maintained in intimate contact at an elevated temperature sufficient to melt a proportion of the polymer and subsequently compressed so as to produce a coherent polymer sheet. On cooling the molten materials recrystalise to give a phase with a lower melting point than the original fibrer. In general the amount of material melted is preferably at least 5% and usually at least 10% of the original cross section of the individual strands. It is believed that that this minimum amount is required in order fill the spaces between fibres upon compaction and hence produce a product which does not contain trapped air. Processes in which a greater proportion of the polymer material is melted at the contact stage are useful in so far as the mechanical properties of the product in the direction transverse to the alignment of the fibres may be improved but this improvement is achieved at the expense of the properties in the direction of the alignment of the fibres. We have discovered that the improvements in the transverse direction are not directly proportional to the losses in the direction of alignment and that the loss is greater than the improvement. For most applications of the products of this invention the preferred processes are those which are carried out in a manner which selectively melts from 5 to 10% by weight of the polymer material although processes which melt from 10 to 20% by weight of the polymer or even up to 50% by weight may be useful.

The pressure at which the assembly of fibres is maintained during the process will be such as to maintain the individual fibres in intimate contact but not such as will compact them and in particular not inhibit the selective melting of the polymer. In general pressures in the range 0.5 to 2.0 MPa are preferred. The precise value is not normally critical.

The compaction pressure exerted upon the heated assembly of oriented polymer fibres should be sufficient to produce a homogeneous product but should not be so great as to cause the assembly to be extruded. Homogenious means that the final component comprises all the same material and air bubbles and the like are excluded but it will be appreciated that the core of each fibre has not been melted or softened and remains in its original form. The outer portion of each fibre has been softened in order to allow the fibres to bond to each other and when the softened portion hardens again the structure comprises cores of fibre surrounded by a mass of solidified material which bonds the cores together and the final products exhibit a homogeneous appearance to the eye. The time required for the processes of this invention may be determined by empirical means. The time required to bring the assembly of fibres up to the requisite temperature will vary with the nature and size of the assembly, the nature of the polymer and the heating means which are employed. The time is not critical provided it is sufficient to enable the selective melting to be achieved. The time required for the compaction step is also non critical except in so far as it must be sufficiently long to enable the assembly to be compacted. The assembly of oriented polymeric fibres which may be utilised in the processes of this invention may take a variety of forms. In particular they may be arranged as an uniaxially aligned bundle or a twisted bundle of fibres or an assembly of chopped fibres or as a mat of interwoven bundles or a mat formed by layering of bundles of fibres wherein the bundles in each layer are aligned at an angle, e.g. conveniently perpendicular to one another. The products obtained by processing such mats may thus retain the majority of the properties of the oriented fibres in more than one direction. The bundles may be assembled and pressed into any convenient shape. The products may be flat sheets, rods, bars, any of which may be shaped so as to be suitable for particular applications.

The oriented polymer fibres may be obtained by any of the known manufacturing processes. In particular, fibres which have been produced by melt spinning and drawing and gel spinning and drawing. Typically such fibres will have a diameter in the range 0.005 to 0.05 mm.

EXAMPLES

PVC/PVCC

FIG. 1 attached hereto illustrates the glass temperature (Tg) of the polymer material comprising 80% amorphous PVC and 20% PVCC and available through Rhovyl of France. The material is used to manufacture clothes having different properties such as flame retardancy, thermal, electrical and acoustic insulation and a shrinkage ratio close to zero. From the graph it will be appreciated that the Tg can be determined by isolating the minor disturbance to the comparatively straight line progression in the heat flow (mW) at about 87° C. Above this temperature the material becomes progressively more soft and pliable but it should be noted that it does not change from a solid to a liquid phase in the manner of a crystalline polymer.

Figure 2:
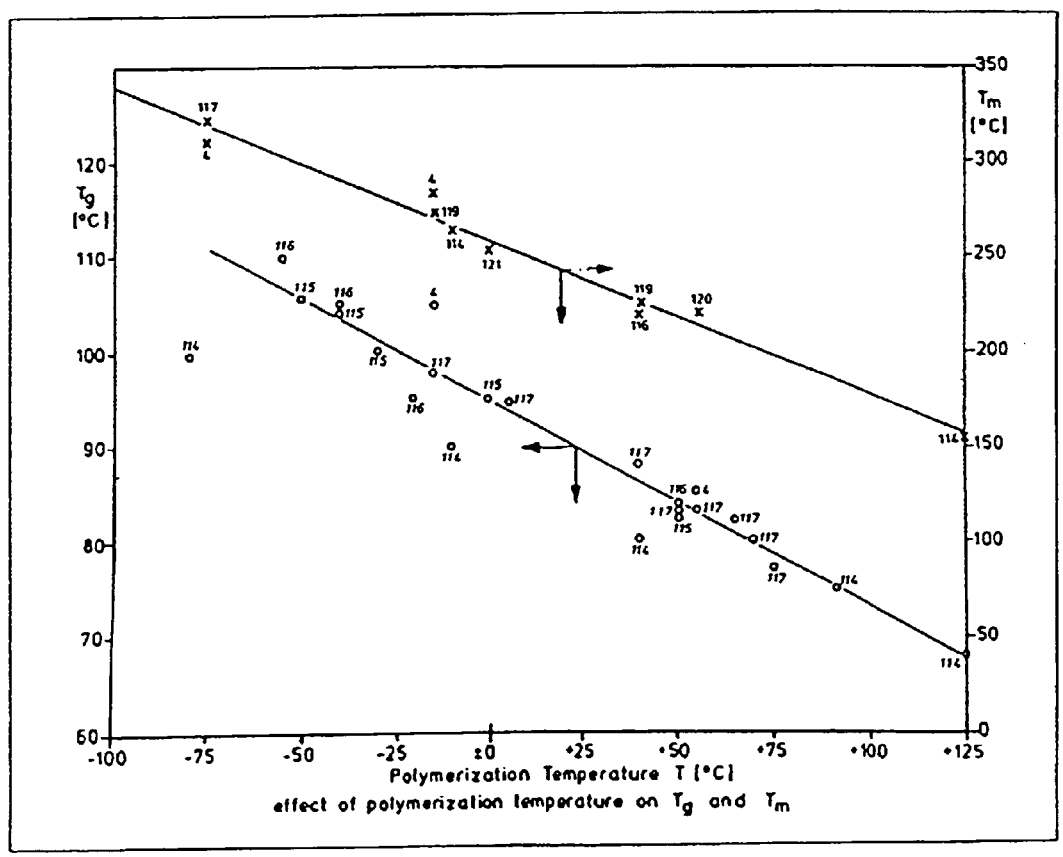
FIG. 2 illustrates the evolution of the glass temperature Tg and melting temperature Tm against the temperature of polymerisation for PVC.

FIG. 2 illustrates the change in the glass temperature (Tg) and the melting temperature (Tm) for various polymerisation temperatures. From this graph it will be appreciated that (as a general rule) the greater the polymerisation temperature the less the Tg and Tm for a particular polymer material.

In order to determine the required compaction temperature for the above-mentioned example comprising 80% PVC and 20% PVCC we first attempted to compact a 2 inch square comprising two layers at 10 psi and 80° C. (temperature around the Tg) and observed the results. As no compaction appeared to take place we increased the temperature to 87° C. but again no compaction appeared to take place. Finally, the layers were place directly between the plates of the compaction apparatus and the temperature was increased gradually until approximately 125° C. was reached, at which point the layers had shrunk slightly and the surface finish of the article had changed. In order to produce sample 1 of table 3 the temperature was increased to 130° C. whilst maintaining 100 psi. The total heating time was recorded as 12 minutes with a dwell time at 130° C. of just 30 seconds and a cooling time of 5 minutes 30 seconds. In order to provide a number of samples for future testing a further 14 samples each having four layers of cloth were produced in accordance with the remainder of FIG. 3. As shown in FIG. 3 each of the first 7 samples were compacted at 100 psi and the remaining examples were compacted at 400 or 550 psi. For each of the samples the total time, dwell time and cooling time was as detailed in the table.

The above-mentioned test samples were provided in order to determine the temperature at which optimum compaction takes place as well as the temperature above which a certain degree of reduction of material properties can be expected. Of the results obtained it was observed that the sheets were quite thin (½ millimetre) but the most striking observation was the presence of a clear, transparent area. This is in stark contrast with most other hot compacted sheets studied so far, which are usually transparent, but often translucent when compacted in this manner due to their crystalline nature. Initial samples showed just a small portion of clear, transparency and it was thought that this was due to the problems associated with providing a uniform pressure distribution across the surface of the material during compaction. In order to provide larger areas of clear, transparent material a piece of silicon rubber was used in the mould during subsequent testing. The clarity and transparency of the remaining samples was much greater than had been achieved without the silicon rubber and it was further observed that the structure of the woven cloth was hardly visible to the naked eye. This is in stark contrast with woven polypropylene materials formed in this manner where the structure can be quite distinctly observed. Increasing the pressure up to 400 psi resulting in a larger area of clear transparency and samples were made of higher temperatures of 150, 160 and 170° C. The sheets obtained had different colours, the one compacted at 150° C. was yellow coloured and more than half was clear/transparent, the sample made at 160° C. was more brown and less clear whilst the sample produced at 170° C. was quite dark. The darkening has been attributed to oxidation of the pigment used in these fibres as a deterioration of properties was not found.

For all the samples discussed so far the temperature control was conducted manually and in order to ensure reproducibility for future tests it was decided to repeat the tests using an electronically controlled heating step. Graph I illustrates the temperature profile employed where a compaction temperature of 150° C. and comprises 5 temperature steps. Step 1 comprises a ramp increase in temperature from 70 to 135° C. at a rate of 10° C. per minute which is completed before a dwell time of 5 minutes which comprises step 2. A third step comprises a second ramp in temperature from 135° C. to 152° C. at a rate of 1° C. per minute before step 4 which comprises a second dwell time of 5 minutes. It is at this higher temperature that compaction was taking place and once compaction was completed a final fifth step of straight-line cooling was employed back down to 70° C.

The first dwell time is only necessary because in the present apparatus there is a temperature lag of 15–20° C. between the temperatures of the plates and the inside of the mould. This dwell time allows the temperature inside the mould to reach the set temperature and ensures more even and consistent results. Clearly, more advanced and better controlled systems would allow for this dwell time to be eliminated. The second ramp in temperature from the second to the third temperature is at a lower rate which permits the temperature inside the mould to rise more evenly than during the first ramp in temperature.

In a simplified arrangement the following steps may be used:
 (i) applying the compaction pressure to the assembly;
 (ii) raising the temperature from a first, lower, temperature to a compaction temperature;
 (iii) holding the temperature at the compaction temperature for a period of time; and
 (iv) reducing the temperature from the compaction temperature in accordance with the predetermined cooling strategy.

In a specific example of the simplified arrangement the pressure applied in step (1) is in the region of 2.8 MPa (400 psi to the assembly), the temperature is increased to 152° C.

which is held for between 5 and 27 minutes before returning to room temperature in accordance with a predetermined cooling strategy.

In order to provide further samples for testing we then produced samples 16–25 as detailed in FIG. 4 attached hereto. Whilst the specific temperatures and dwell times are shown in the table it is worth noting that each of the samples comprises a four layer, five inch square compacted at 400 psi using a rubber sheet as described above in order to provide an even distribution of pressure across the article. Additionally, it should be noted that the temperature inside was taken by means of a thermocouple placed between the layers of cloth whilst the temperature outside comprises a temperature from a thermocouple positioned within the mould.

FIG. 5 is a simplified table deleting the inside and outside temperatures from that described above but retaining the general conditions of four layers, five inch squares and the use of rubber compaction sheet. In this particular table, two pressures of compaction namely 200 and 400 psi have been employed. FIG. 6 comprises samples 30–36 and details the range of temperature during the last dwell time. FIG. 7 details the treatments of two inch squares of the samples 37–40 and provides some very prolonged cycle times and alternative cooling regimes. FIG. 8 provides details of samples 41, 42 and 44 which were prepared at elevated temperatures well above those discussed above. At these higher temperatures the results were a much darker sample and the surface of the finished article was quite different in that there seemed to be a thin layer of grease on the surface thereof. Excepting for the mechanical tests as to material strength, no further investigations were carried out on these samples.

In the samples provided for in FIG. 6 onward comprised the second program of this present course of work and were conducted with a heating regime similar to the above but following the heating and cooling regime outlined in the tables.

Figure 25:
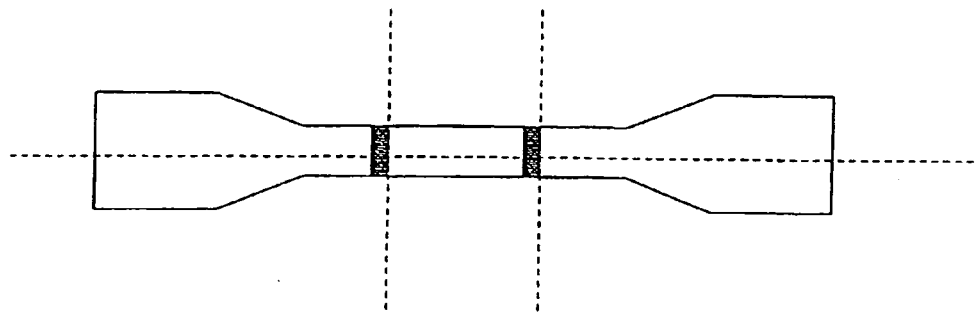
FIG. 25 illustrates a test sample as cut from the compacted sheets.

In order to test the samples provided above we first employed an Instron tensile machine employing a videoextensometer to measure the deformation of the specimen. This is in contrast with a classic extensometer and provides better visual determination of the final results. Such equipment is more suitable for polymer materials as it is a no contact method and therefore avoids the requirement to employ an external force to the specimen. Samples were cut from compacted sheets with a suitable dumbbell cutter the shape of which is shown in FIG. 25 and two target lines are drawn on the thinned central area with a suitable white pen. The sample was then lit such that the intensity of light on the target region was much higher than the rest of the image available on the videoextensometer screen. During testing, the first force of 10N was applied in order to flatten the sample and then a force of 25N was applied which places the specimen in its elastic phase and the modulus can be measured. The final step of testing comprises allowing the sample to be broken by applying continually increasing load at the rate of extension by 1 mm/min.

Figure 26:
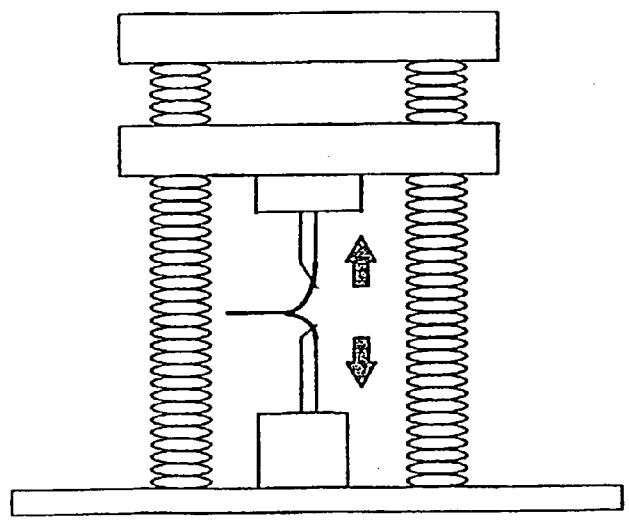
FIG. 26 is a diagrammatic representation of a peel test apparatus.

In order to facilitate the conduction of a "peel test" the compacted layers were prepared with a 10 μm narrow strip of aluminium incorporated at one end between the layers which acts as a starter crack for subsequent peel testing. 8 mm larger test specimens were cut from the compacted sheets and the force required to peel the strips apart was measured by fixing the two extremities into the jaws of an Instron tensile machine. This test gave us a measure of the strength of bonding between the fibres and be shown diagramatically in FIG. 26.

Figure 27:
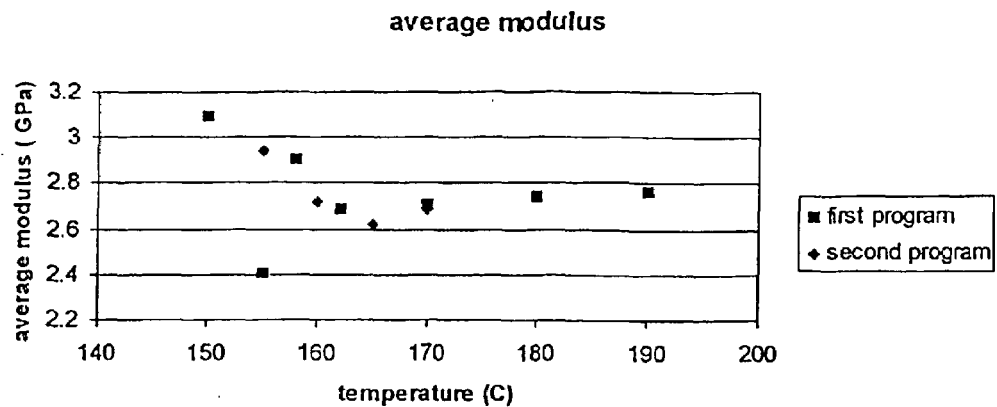
FIGS. 27 to 29 are graphs of average modulus, final strength and peel strength respectively.

In order to determine the influence of the processing temperature on the modulus of the final product a number of samples from the first and second programs were tested and the results are shown in FIG. 27. Observing FIG. 27 we can see that the modulus varies from between 2.4 to 3.1 GPa. Considering the standard deviation between 0.1 and 0.2 GPa (and the margin of error when plotting) we can confirm that the modulus does not depend significantly on the temperature of compaction. In addition to this test, a number of sheets from the second program were cut in directions perpendicular to each other and it was confirmed that the results did not vary.

Figure 28:
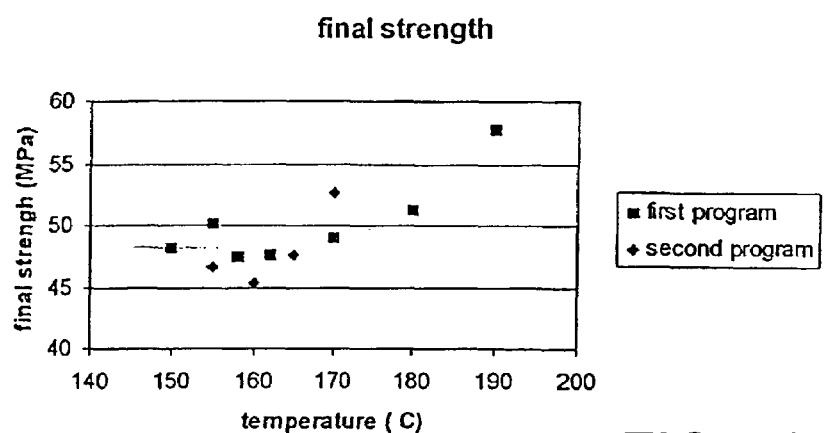

Further tests were conducted in order to establish the ultimate strength of the compacted articles. The results of this evaluation are shown in FIG. 28 from which it can be appreciated that the ultimate strength ranges from between 47.4 to 57.8 MPa and only the final sample taken at 190° C. varies much from the others in the group. Whilst it seems reasonable to conclude that at lower temperatures the ultimate strength is not significantly affected by the processing temperature it is possible that at temperatures at and above 180° C. there is an affect thereon. Additional experimentation on samples compacted at higher temperatures will be necessary in order to finalise this data.

Figure 29:
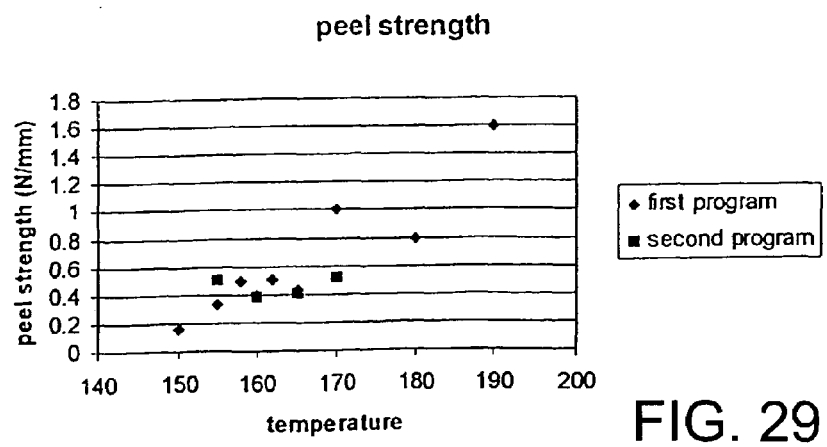
Figure 30:
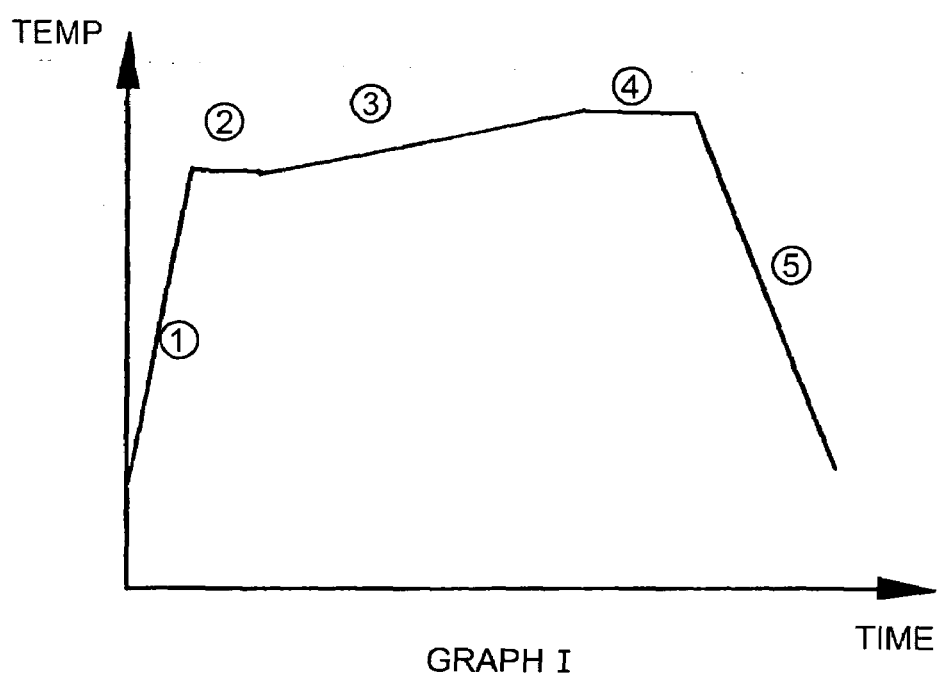
FIG. 30 illustrates the heating cycle.

An additional "peel test" was conducted and the results are provided in FIGS. 17 and 18 attached hereto. A brief comparison of the results is shown in the graph of FIG. 29 from which it can be appreciated that the peel strength is generally increased as the temperature of treatment rises. An additional test in connection with the "dwell time" on the modulus and final strengths of the compacted samples. The results of this test are shown below:

| Specimen made at 155 C. and 400 psi (5 inch) with the first program | | | |
|---|---|---|---|
| Number of Sample | Dwell Time | Average Modulus (GPa) | Final Strength (MPa) |
| 27 | 27 min | 2.666 | 42.8 |
| 29 | 2 min 30 s | 3.357 | 28 |
| Specimen made at 160 C. and 400 psi | | | |
| Number of Sample | Dwell Time | Average Modulus (GPa) | Final Strength (MPa) |
| 38 | Straight Cooling | 2.428 | 39.6 |
| 39 | 10 min | 2.805 | 47.9 |
| Peel Test | | | |
| Number of the Sample | Average Load (N) | Peel Strength (N/mm) | |
| 27 | 3.695 | 0.4619 | |
| 29 | 2.534 | 0.3167 | |
| 38 | 3.972 | 0.4701 | |
| 39 | 3.338 | 0.4172 | |

From the above it will be appreciated that the modulus does not vary significantly with the dwell time but the final strength is slightly higher for longer dwell times. The peel test illustrates that the bonding between strands of the material is better with longer dwell periods.

Also considered during this testing was the influence of the cooling rate on the final material properties. The cooling rate could be a crucial factor for hot compaction and for this reason it is important to determine whether or not it has a significant impact for the material under discussion herein.

The final results for these tests comprise samples 38, 39 and are shown in the table below.

| Number of Sample | Temperature (C) | Cooling Rate (C/min) | Average Load (N) | Peel Strength (N/mm) | Average Modulus (GPa) | Final Strength (MPa) |
|---|---|---|---|---|---|---|
| 38 | 160 | 19.5 | 3.338 | 0.4172 | 3.253 | 46.15 |
| 39 | 160 | 5 | 2.729 | 0.5235 | 2.941 | 45.8 |

From the above, it can be noted that increasing the cooling rate some four times has little if any impact on the peel strength and the average load. Additionally, tensile tests illustrated that no significant variation in the modulus or the final strength can be detected. Consequently, it is reasonable to assert that the cooling rate has little if any impact on the final properties on the finished article.

Figure 31:
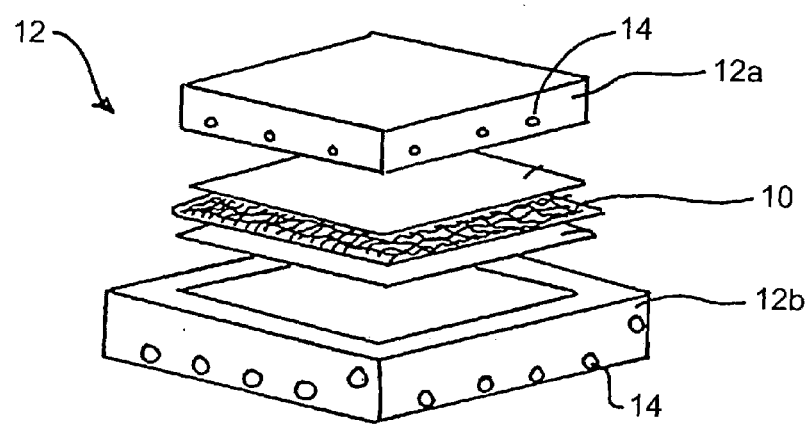
FIG. 31 is a diagrammatic representation of the compaction apparatus employed in the experiments described herein.
Figure 32:
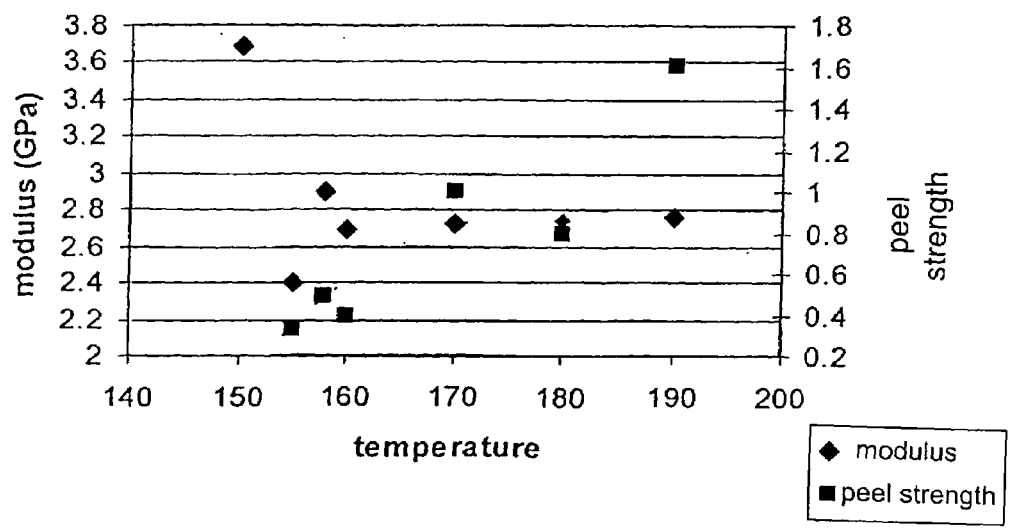
FIG. 32 is a graph illustrating the modulus and peel strength for samples created at different temperatures.

In order to confirm that forming of compound curved components is possible whilst employing the compaction method and the above-described material we conducted a further test in this respect. For this particular study, three sheets 10 (see FIG. 31) were prepared with different numbers of layers: four, six and eight and each were compacted in a five inch mould 12 at a temperature of 170° C. and a pressure of 400 psi. The plates of the mould 12a, 12b within the apparatus were heated to 120° C. by heaters 14 and the sample sheet was placed on the bottom plate 12b and allowed to warm for five minutes in order to become soft. The top and the bottom of the moulds shown in FIG. 31 were then pushed together before the heating oven was opened and the articles allowed to cool in accordance with the above-discussed practice. For each of the specimens it can be confirmed that thermo forming was successful as the shape obtained was dimensionally accurate, stiff and resilient. This was particularly the case for the sample made with eight layers.

In order to confirm the viability of the suggestions made above apply across a range of material further experimentation was conducted in connection with pure PVC material in the form of grade L9Y (high shrinkage 55% at 98° C.) multifilament fibre provided by Elf Atochem.

As mentioned above, PVC is an amorphous polymer (Tg~85° C.) having no crystals within the structure and therefore no sharp melting temperature. As outlined above, hot compaction was considered to work well with the PVC/PVCC cloth as samples can be made over a wide temperature range, although the optimum was considered to be 170±10° C. It is thought that this wide temperature window indicates a different bonding mechanism (fusion or a chemical effect) to that of crystalline melting seen with the semi-crystalline polymers previously studied. The peel strengths were good in as much as they were in the upper range of the material studied so far. Additionally, the modulus was in the order of 3 GPa and the strength was ~60 MPa and the woven cloth produced well bonded transparent sheets.

In order to ascertain whether the blend of PVC and PVCC was an important factor for the hot compaction of PVC we compacted further samples as detailed below. The first three samples comprise unidirectional LY (pure PVC) fibres and each was compacted at the optimum temperature of 170° C. The comparative results appear to confirm that hot compaction of amorphous polymers is not only possible but produces advantageous results. Again, clear transparent regions were obtained for the pure PVC samples which indicates good compaction. Additionally, there is good retention of the oriented properties of the original fibre within the compacted sheet. The transverse strength of the unidirectional samples was high, reflecting excellent bonding and the modulus value of the unidirectional samples suggest the fibre was not as highly drawn as that used in the cloth sample. Woven cloth appears to be a better form for compaction of PVC, as for most oriented fibres, while the unidirectional samples showed regions where the fibres had broken (due to high shrinkage and a soft material at elevated temperature), a woven sample showed no evidence of this. Of course the difference in behaviour could easily be due to the difference in the two fibres used. Other amorphous polymers such as polyacrylonitrile (acrylic fibres) should benefit from this technique.

| | | Modulus (GPa) | Longitudinal Strength (MPa) | Transverse Strength (MPa) | Peel Strength N/10 mm |
|---|---|---|---|---|---|
| Unidirectional L9Y | Original fibre | 5.02 | 320 | | |
| | Compacted Longitudinal | 3.8 | 100 | | |
| | Transverse | 2.4 | | 30 | |

EXAMPLE

Polyacrylonitrile (PAN)

A series of compaction experiments have been carried out on polyacrylonitrile fibres (PAN) and the properties have been compared with PVC/PVCC and other materials.

Staple PAN fibre was sourced through Acordis. The glass transition temperature of PAN is 105° C., compared to ~85° C. for PVC. For PVC, good samples were made over the temperature range 150–190° C., with the level of bonding continuing to increase over this range. In light of the 20° C. offset in the value of Tg for the two materials, it was decided to start compaction trials for PAN at 170° C.

The fibre tows were first wound around a 7" square metal plate to the required weight. The metal plate is then assembled between layers of release film and two rigid copper plates, to form the compaction assembly. A thermocouple was placed in the centre of the fibre assembly to allow the exact compaction temperature to be measured. The PAN fibre tows were very thick, and so it proved quite difficult to achieve an even distribution of fibres over the plate surface. The effect of this was that during compaction, uneven pressure is applied to the fibre assembly, with the effect that for some areas (which are under high pressure) the compaction was good, whereas in other areas compaction was unsuccessful. The solution to this problem is to use silicon rubber sheets between the fibre assembly and the outer copper sheets, which helps even out the applied pressure.

Trials were carried out using the following procedure.
1) Set the press to the desired temperature
2) Make up the compaction assembly and place in the press: apply the compaction pressure, which was 400 psi for the first series of tests.
3) Monitor the assembly temperature and when it reached the desired compaction temperature, leave for a set dwell time, which was 5 minutes.
4) After the dwell, cool and remove the samples. Each test produces two samples from either side of the metal plate.

In the first series of trials, samples were made at 170, 180, 190, 200, 210 and 230° C. The samples above 200° C. showed increased darkening suggesting the possible onset of degradation. This fits well with commercial PAN literature, which suggests the onset of char at around 230° C. The samples all showed some areas which were transparent, indicating good compaction. These areas became larger as the temperature was increased.

In the next series of trials, samples were made at 190° C. with an variety of compaction pressures.

A visual inspection of the final products show how the sample appearance changed with increasing compaction pressure. It was seen that the transparent area of the sample increased with increasing pressure, although even at a pressure of 1200 psi, there were still some uncompacted areas. To aid pressure transfer, the last sample was made using rubber sheets either side of the assembly. This last sample showed a very even compacted area in the centre of the sample, through which it was possible to see a sheet of paper with an attached logo.

Mechanical tests were next undertaken on the best sample, i.e. 190° C., 5 min dwell, 1200 psi, rubber sheets.

Strips were cut both parallel to the fibre direction and transverse to the fibre direction.

Longitudinal samples were tested in tension (best geometry for longitudinal test as longitudinal samples cannot be broken in bending), while transverse samples were tested in bending.

The results of these tests are shown below, in comparison with the previous PVC

|  |  | Modulus (GPa) | Longitudinal Strength (MPa) | Transverse Strength (MPa) |
|---|---|---|---|---|
| PAN | Longitudinal | 6.64 ± 0.34 | 163 ± 15 |  |
|  | Transverse | 3.02 ± 0.40 |  | 26.3 ± 2.4 |
| PVC | Longitudinal | 3.8 | 100 |  |
|  | Transverse | 2.4 |  | 30 |

Typical Properties of Compacted PAN and PVC Sheets

The compacted PAN fibres showed quite a good level of bonding (transverse strength) comparable with PVC and previous work on semi-crystalline polymers. The longitudinal modulus and strength were significantly higher than for PVC, probably due to a higher degree of orientation in the original fibres. The strain to failure of the compacted PAN sheets was lower than PVC, as expected.

Typical stress-strain curves, for the best samples, are shown in FIG. 33.

Conclusions:
Compaction of PAN fibres appears very feasible and follows the same methodology established in the previous PVC work
The optimum compaction temperature appears to be at about the same temperature, offset above Tg, as for PVC
The properties of the compacted PAN sheets are better than PVC and comparable to previous results for crystalline polymers.

EXAMPLES

Staple PVC/PVCC and Pare PVC

Further samples of oriented PVC in its staple form were supplied by Elf to help expand the understanding of the hot compaction of PVC. These comprised staple fibre ZCS PVC/PVCC and staple L9Y pare PVC. The results are shown below together with data collected for woven ZCS PVC/PVCC and contiguous fibre L9Y pure PVC.

Hot compaction of ZCS PVC/PVCC fibre.

The first tests were carried out using the staple fibre. This was a very thick fibre low, and therefore quite difficult to spread evenly for the compaction procedure. The technique used was that developed for PAN staple fibre previously discussed, and involved winding the staple fibre around a metal plate, producing two samples per experiment. The plate was then assembled between sheets of soft aluminium foil, placed into a hot press and compacted in the normal way.

As with all hot compaction studies, the aim is to ascertain the optimum processing conditions where good fibre to fibre bonding can be achieved without significant loss of orientation of the original phase. In the semi-crystalline studies previously carried out, this manifests itself as an optimum temperature where ~20–30% of the original oriented phase is melted. For amorphous PVC, a sharp melting transition is obviously not seen, but a gradual softening of the material is seen as the temperature is raised above the glass transition temperature, Tg, which for PVC is –85° C. However the aim is still to assess the trade-off between bonding and loss of orientation. Strips were cut from the compacted samples both parallel and transverse to the fibre direction. Measurements were made of the longitudinal properties in tension (a reflection of the level of orientation remaining in the original fibres) and the transverse strength in bending (a measure of the development of bonding between the fibres).

An important variable for the compaction procedure is always the compaction pressure. This is likely to be important for PVC, as the pressure will act to restrain any shrinkage, and subsequent loss of orientation, that might occur as the temperature is increased. Preliminary samples were therefore made at 150 and 160° C., using pressures of 400 and 1200 psi. A dwell time of 5 minutes at the compaction temperature was used for all the tests in this report, and the temperature of the compaction assembly was monitored by placing a thermocouple in the centre of the fibres on one side of the plate.

FIG. 34 shows typical stress-strain curves for longitudinal samples There are a number of important points to note
At 150° C. the higher pressure gives much higher values of initial modulus and strength, suggesting the higher pressure helps to restrain shrinkage at this temperature.
The modulus and strength at 150° C. are better than those at 160° C., but the failure strain is higher at 160° C.

These trends are due, presumably, to less loss of orientation (less shrinkage) at the lower temperature.

At 160° C. there is much less difference in the samples made at the two pressures: at this higher temperature perhaps even 1200 psi is not enough to restrain the fibres. A higher pressure could have been used, although this would be larger than that available on the commercial machinery.

The combined longitudinal and transverse results, which are average values of four tests, are shown below in Table 1. The modulus of the original fibre was measured as 6.03 GPa at a frequency of 1 Hz.

TABLE 1

Properties of unidirectional ZCS samples

| Temp (° C.) | Pressure (psi) | Longitudinal Modulus (GPa) | Longitudinal Strength (MPa) | Longitudinal Failure strain (%) | Transverse Modulus (GPa) | Transverse Strength (MPa) | Transverse Failure strain (%) |
|---|---|---|---|---|---|---|---|
| 150 | 400 | 4.06 ± 0.21 | 150 ± 4 | 23 ± 1 | 2.89 ± 0.1 | 49.1 ± 2.8 | <2% |
| 150 | 1200 | 5.03 ± 0.23 | 181 ± 18 | 21 ± 2 | 3.17 ± 0.40 | 51.3 ± 6.6 | <2% |
| 160 | 400 | 3.69 ± 0.27 | 159 ± 3 | 34 ± 2 | 3.3 ± 0.12 | 68.1 ± 3.7 | <2% |
| 160 | 1200 | 3.98 ± 0.37 | 148 ± 5 | 30 ± 2 | 3.65 ± 0.14 | 80 ± 1.6 | <2% |

Again there are some important points to note

The loss of longitudinal properties for the best processing conditions (150/1200) is 17% which is comparable to semi-crystalline results.

A higher pressure gives a higher transverse strength

A higher temperature gives a better transverse strength

The transverse properties show brittle behaviour with failure at a very low strain. This could cause problems when we come to woven samples, where the properties in any direction are a combination of longitudinal and transverse properties.

For the next series of samples, a pressure of 1200 psi was used throughout, but a range of temperatures between 140° C. and 180° C. were used.

Figure 35:
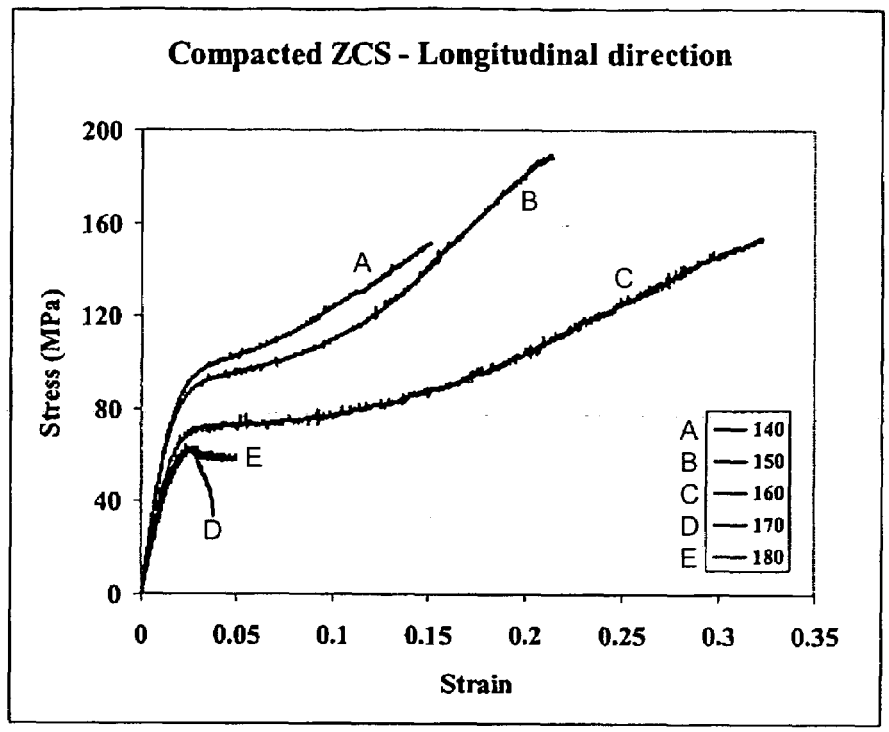
FIGS. 35 and 36 show long tudinal and transverse stress-strain results for ZCS.
Figure 36:
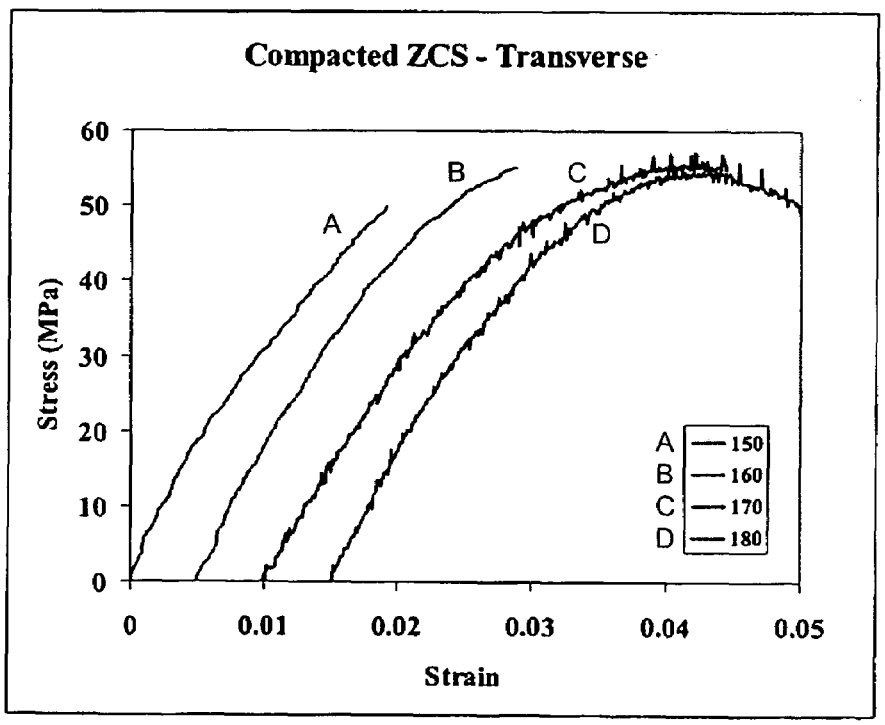

FIGS. 35 and 36 show the longitudinal and transverse stress-strain results from these tests.

For the longitudinal samples the strength and failure strain initially increased as the bonding increased and then fell as the level of preferred orientation dropped. Interestingly, the deformation behaviour goes from being dominated by orientation up to 160° C., to one of traditional yield at 180° C. and above, accompanied by significant necking. It appears that at 180° C. and above the material is behaving almost like homogeneous PVC sheet, with most of the original preferred molecular orientation being relaxed. At a temperature of 170° C. the material is at a transition between these two types of behaviour and neither strain hardens nor draws stably. The transverse tests (tension) reflect this same trend, with a transformation from brittle failure to yield between 170 and 180° C. At 180° C. there is little difference between the longitudinal and transverse properties.

Figure 37:
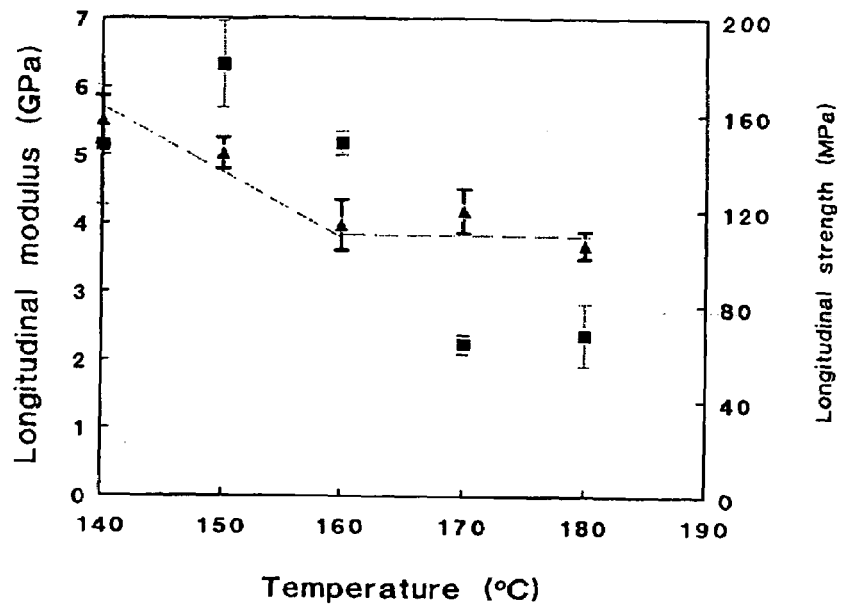
FIG. 37 shows the longitudinal modules and strength against temperature of compaction for various samples.

FIG. 37 shows the longitudinal modulus and strength plotted against temperature. This shows that by a temperature of between 160 and 170° C., the original preferred molecular orientation has been relaxed, even at a compaction pressure of 1200 psi.

Figure 38:
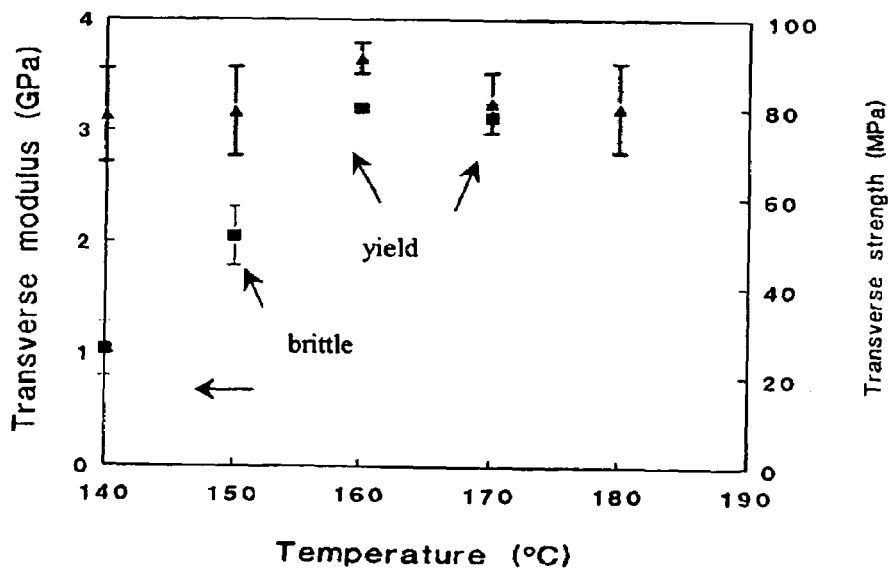
FIG. 38 shows how the transverse modules and strength vary against temperature.

Tests were also carried out in bending in the transverse direction and FIG. 38 below shows these results. In the brittle regime the bending strengths are comparable to the previously reported tensile results, while in the yielding regime the bending strength is higher than the associated tensile strength as is normally seen. The transition between brittle fracture and yield occurs at a slightly lower temperature in bending, but in essence the results are the same as seen in tension.

The next stage was to look at the compaction behaviour of woven ZCS fibre. These tests were actually completed at a compaction pressure of 400 psi. Although this is lower than would be considered optimum, from the unidirectional results presented above, the woven nature of the cloth may add additional constraint to help restrain shrinkage.

Figure 39:
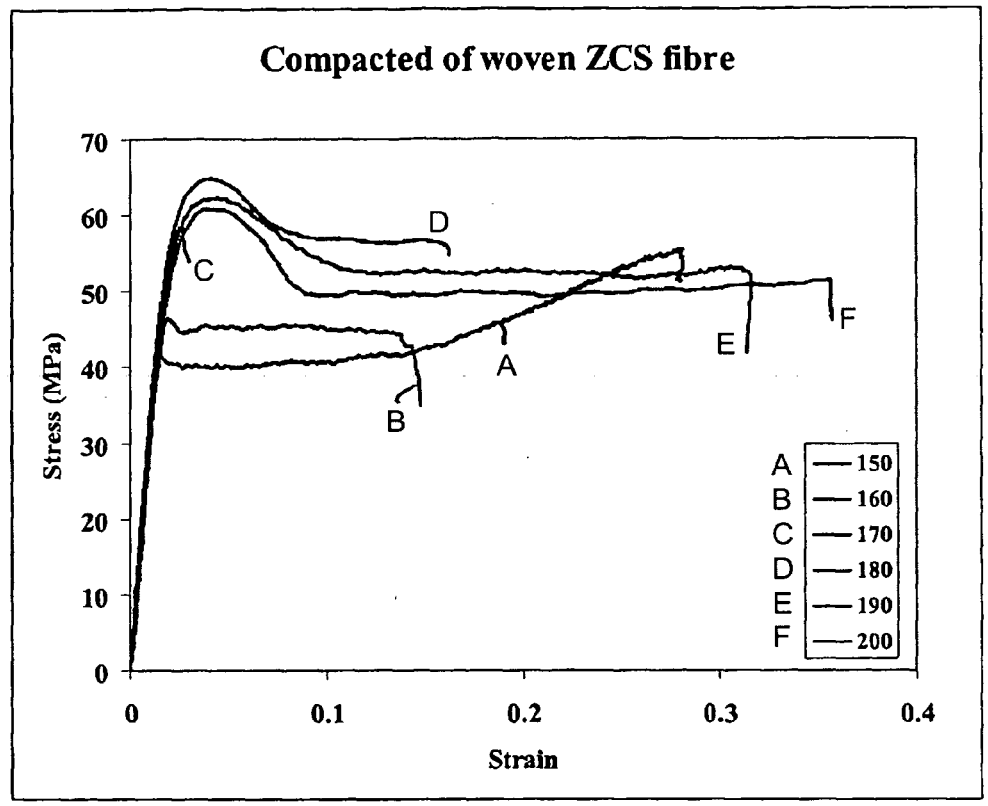
FIG. 39 illustrates the tensile stress-strain curves for compacted woven ZCS fibre.

The results from the woven samples are shown in FIG. 39 and can be understood in terns of the unidirectional results previously shown in FIGS. 35 and 36. At the lowest compaction temperature of 150° C., the sample fails at a low stress of ~40 MPa due most probably to the low transverse strength. As the compaction temperature is raised, the initial failure stress rises as the bonding increases but the failure strain falls due to relaxation of preferred orientation. The sample made at 170° C. showed the lowest failure strain as seen in the unidirectional tests. As the compaction temperature was further increased, the samples then showed a true yield point, followed by necking and an associated load drop. The transition between brittle and yield behaviour of these compacted woven samples in tension, between 170 and 180° C., reflects directly the same transition seen in the transverse tests shown in FIG. 36. As with all woven or cross plied composites, the transverse strength is as important as the longitudinal strength, as a low transverse strength, or much lower failure strain compared to the longitudinal failure strain, can compromise performance before the longitudinal fibres are taken to their maximum stress.

Figure 40:
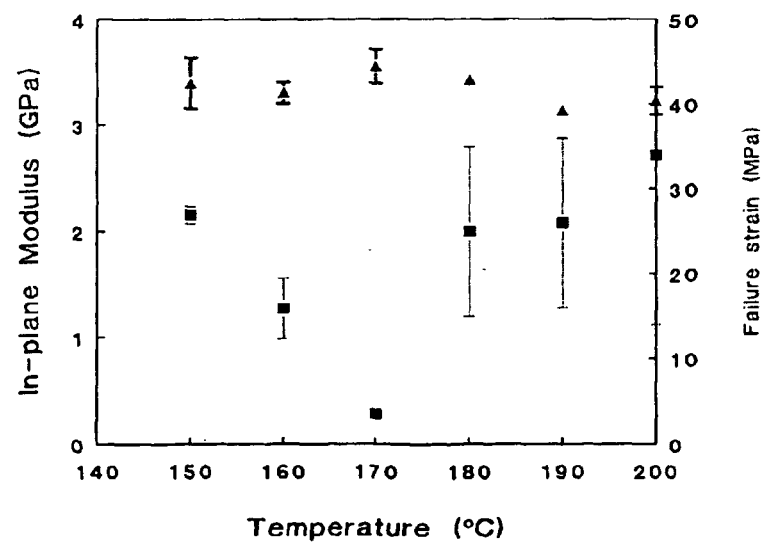
FIG. 40 illustrates the in-plane modules and failure strain against temperature for compacted woven PVC.

The initial modulus appears relatively independent of compaction temperature, as concluded in the original study carried out in 2000. FIG. 40 shows this plotted against compaction temperature, together with the failure strain which confirms the above trend seen in FIG. 39.

We can speculate that at low compaction temperatures the modulus is low due to poor bonding between the fibres, and at high temperatures we have relaxed the majority of the preferred molecular orientation.

Figure 41:
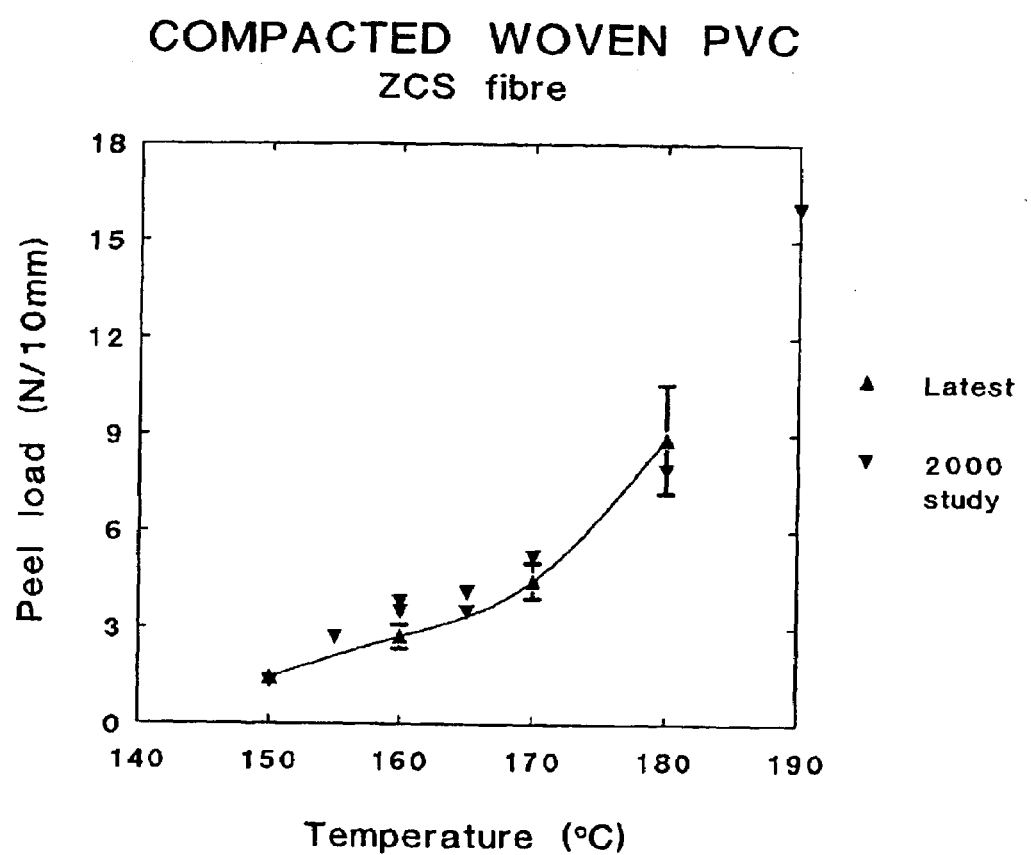
FIG. 41 illustrates the peel load against temperature for two sets of samples.

An important measure of compacted woven sheets is the peel strength, a measure of the interlayer bond strength. FIG. 41 show the latest measurements of peel strength for the same range of temperatures as shown above. Also shown on this Figure are the values from the first examples, which are in excellent agreement with those obtained here.

The peel results show that, as expected, the bond strength increases as the compaction temperature is increased. As we usually consider a peel strength of 8 N/10 mm as sufficient for most situations, this would suggest 2 compaction temperature in the region of 180° C. would be required. However, the tensile results suggest that we should not go beyond a compaction temperature of 160° C., as above this temperature significant relaxation of the original molecular orientation has occurred.

We therefore reach the nub of the challenge with the hot compaction of PVC, namely that sufficient bonding can only be achieved at the expense of substantial loss of molecular orientation. In semi-crystalline materials, we are able to melt a fraction of the fibre surfaces and so get increased mobility compared to the inner core. This allows us to obtain surface bonding without sacrificing the preferred orientation of the bulk of the fibre. In an amorphous material, such as PVC, the mechanism for fibre to fibre bonding depends on molecular mobility and interpenetration at the fibre surfaces. As we increase the temperature to increase molecular mobility, this increased mobility will also lead to relaxation of the frozen-in preferred orientation.

Summary of Results:

PVC/PVCC a) staple fibre—unidirectional construction—new results.

| Temp (° C.) | Pressure (psi) | Longitudinal Modulus (GPa) | Longitudinal Strength (MPa) | Longitudinal Failure strain (%) | Transverse Modulus (GPa) | Transverse Strength (MPa) | Transverse Failure mode |
|---|---|---|---|---|---|---|---|
| 140 | 1200 | 5.51 ± 0.36 | 147 ± 25 | 14 ± 4 | 3.13 ± 0.42 | 28 ± 6 | Brittle |
| 150 | 400 | 4.06 ± 0.21 | 150 ± 4 | 23 ± 1 | 2.89 ± 0.1 | 49.1 ± 2.8 | Brittle |
| 150 | 1200 | 5.03 ± 0.23 | 181 ± 18 | 21 ± 2 | 3.17 ± 0.40 | 51.3 ± 6.6 | Brittle |
| 160 | 400 | 3.69 ± 0.27 | 159 ± 3 | 34 ± 2 | 3.3 ± 0.12 | 68.1 ± 3.7 | Yield |
| 160 | 1200 | 3.98 ± 0.37 | 148 ± 5 | 30 ± 2 | 3.65 ± 0.14 | 80 ± 1.6 | Yield |
| 170 | 1200 | 4.19 ± 0.32 | 64 ± 4 | 3.5 ± 3 | 3.25 ± 0.27 | 78 ± 3.3 | Yield |
| 180 | 1200 | 3.7 ± 0.1 | 68 ± 13 | 12 ± 7 | 3.21 ± 0.40 | — | Yield |

Longitudinal values measured in tension - ASTM D638
Transverse values measured in 3 point bend. - ASTM D790 b) woven fibres—repeat of original work

| Temp (° C.) | Pressure (psi) | Longitudinal Modulus (GPa) | Longitudinal Strength (MPa) | Longitudinal Failure strain (%) | Peel strength (N/10 mm) |
|---|---|---|---|---|---|
| 150 | 400 | 3.4 ± 0.24 | 51.6 ± 3.5 | 27 ± 1 | 1.46 ± 0.23 |
| 150 | 1200 | 4 ± 0.1 | 61 ± 4 | 25 ± 1 | 1.18 ± 0.10 |
| 160 | 400 | 3.31 ± 0.10 | 43.6 ± 2.3 | 16 ± 6 | 2.73 ± 0.37 |
| 160 | 1200 | 3.28 ± 0.10 | 52 ± 2 | 25 ± 2 | 2.86 ± 0.32 |
| 170 | 400 | 3.56 ± 0.16 | 52.7 ± 2.3 | 3.6 ± 0.4 | 4.45 ± 0.54 |
| 180 | 400 | 3.43 ± 0.07 | 56.3 ± 3.5 | 25 ± 10 | 8.88 ± 1.68 |
| 190 | 400 | 3.14 ± 0.07 | 52.3 ± 0.6 | 26 ± 16 | >8.88 couldn't be peeled |
| 200 | 400 | 3.23 ± 0.13 | 49.3 ± 1.2 | 34 ± 20 | >8.88 couldn't be peeled |

All tests carried out in tension ASTM D638

Pure PVC-L9Y a) continuous fibre—unidirectional construction—new results.

| Temp (° C.) | Pressure (psi) | Longitudinal Modulus (GPa) | Longitudinal Strength (MPa) | Longitudinal Failure strain (%) | Transverse Strength (MPa) | Transverse Failure mode |
|---|---|---|---|---|---|---|
| 150 | 1200 | 5.80 ± 0.20 | 190 ± 10 | 33 ± 3 | 3.33 ± 0.12 | Brittle |
| 160 | 1200 | 4.9 ± 0.28 | 162 ± 3 | 46 ± 2 | 3.78 ± 0.10 | Brittle |
| 170 | 1200 | 4.57 ± 0.22 | 139 ± 14 | 47 ± 6 | 3.56 ± 0.24 | Brittle |

Longitudinal values measured in tension - ASTM D638
Transverse values measured in 3 point bend. - ASTM D790

Key Points
- PVC/PVCC fibres are better overall as they have a lower shrinkage and a higher strain to failure.
- Pure PVC fibres have a higher modulus (7.1 GPa compared to 6.0 GPa for PVC/PVCC blend) which is translated into a higher modulus in the compacted sheet.
- Pure PVC has a very high shrinkage which limits the compaction temperature to a maximum of 170° C.
- PAN showed a similar temperature offset above Tg for good bonding to be achieved.
- PAN fibres showed a higher modulus, which gave a higher modulus in the compacted sheet.
- Compacted amorphous sheets can be transparent Summary of Pan Results a) staple fibres

| Temp (° C.) | Pressure (psi) | Longitudinal Modulus (GPa) | Longitudinal Strength (MPa) | Longitudinal Failure strain (%) | Transverse Strength (MPa) |
|---|---|---|---|---|---|
| 180 | 1200 | 6.89 ± 0.20 | 211 ± 18 | 16 ± 2 | 28.9 ± 7 |
| 190 | 1200 | 6.64 ± 0.34 | 163 ± 15 | 12 ± 4 | 26.3 ± 2.4 |
| 200 | 1200 | 7.01 ± 0.53 | 171 ± 12 | 13 ± 1 | 34.6 ± 3.1 |
| 210 | 1200 | 8.25 ± 0.70 | 189 ± 18 | 11 ± 1 | 38.7 ± 2.2 |
| 220 | 1200 | 7.62 ± 0.33 | 166 ± 10 | 6.1 ± 1 | 35.1 ± 2.7 |
| 230 | 1200 | 7.84 ± 0.6 | 209 ± 10 | 8.1 ± 1 | 29 ± 1.5 |

Optimum PVC/PVCC for comparison

| Temp (° C.) | Pressure (psi) | Longitudinal Modulus (GPa) | Longitudinal Strength (MPa) | Longitudinal Failure strain (%) | Transverse Strength (MPa) |
|---|---|---|---|---|---|
| 160 | 1200 | 3.98 ± 0.37 | 148 ± 5 | 30 ± 2 | 80 ± 1.6 |

All samples made using a 5 minute dwell time
Longitudinal values measured in tension - ASTM D638
Transverse values measured in bending - ASTM D790 b) continuous fibres

| Temp (° C.) | Pressure (psi) | Longitudinal Modulus (GPa) | Longitudinal Strength (MPa) | Longitudinal Failure strain (%) | Transverse Strength (MPa) |
|---|---|---|---|---|---|
| 210 | 1200 | 7.64 ± 0.60 | 242 ± 15 | 11 ± 1 | |

Longitudinal values measured in tension - ASTM D638

Optimum temperature from staple fibre results is –210° C.
Continuous PAN fibre sample has a similar modulus compared to the staple PAN fibre sample at the same temperature of 210° C.
Continuous PAN fibre sample has a higher strength compared to staple fibre samples.
PAN has a lower density (1180 kg/m$^3$) compared to PVC (1 400 kg/m$^3$).
PAN fibres have a higher initial modulus compared to PVC, and hence the sheets have better properties.
Optimum PVC/PVCC fibre samples have a lower longitudinal modulus and strength but a better transverse strength compared to PAN.

Optimum temperature for PAN is 210° C., 105° C. above $T_g$. For PVC optimum is 80° C. above $T_g$.

The invention claimed is:

1. A method of producing an article comprising the steps:
providing a raw material in the form of a plurality of polymer elements said polymer elements comprising an amorphous polymer;
heating said material to a temperature above a first predetermined temperature; and
compacting said material whilst above said first predetermined temperature, wherein:
said first predetermined temperature is the Tg of the polymer elements,
said pressure is between 100 and 1200 psi; and
said temperature and pressure of compaction are sufficient to soften the outer portion of the said polymer elements and to cause the said polymer elements to bond to each other without melting or softening of the inner portion of said polymer elements,
such as to produce a product the structure of which comprises cores of amorphous polymer that have not been softened or melted in the method, surrounded by a mass of softened and re-hardened material which bonds the cores together.

2. A method as claimed in claim 1 in which said temperature is between 125° C. and 190° C.

3. A method as claimed in claim 2 in which the temperature is between 135° C. and 150° C.

4. A method as claimed in claim 2 in which the temperature is between 150 and 190° C.

5. A method as claimed in claim 1 including the further steps of:
   (i) raising the temperature from a first, lower, temperature to a second, higher, temperature at a first rate over a first period of time;
   (ii) holding the temperature at said second temperature for a second period of time;
   (iii) raising the temperature from the second temperature to a third, higher, temperature at a second rate over a third period of time;
   (iv) holding the temperature at said third temperature for a further period of time; and
   (v) reducing the temperature from said third temperature in accordance with a predetermined cooling strategy.

6. A method as claimed in claim 5 in which:
   (i) the temperature is increased to a second temperature of 135° C. at 10° C./min;
   (ii) the second temperature is held for between 5 minutes;
   (iii) the temperature is increased to a third temperature of 152° C. at approximately 1° C./min;
   (iv) the third temperature is held for between 5 minutes and 27 minutes; and
   (v) the temperature is then returned to a lower (room) temperature in accordance with the predetermined cooling strategy.

7. A method as claimed claim 1 including the further steps of:
   (i) applying the compaction pressure to the assembly;
   (ii) raising the temperature from a first, lower temperature to a compaction temperature;
   (iii) holding the temperature at the compaction temperature for a period of time; and
   (iv) reducing the temperature from the compaction temperature in accordance with a predetermined cooling strategy.

8. A method as claimed in claim 7 in which the pressure applied in step (1) is in the region of 2.8 MPa (400 psi), the temperature is increased to 152° C. and is held for between 5 and 27 minutes before returning to the lower temperature in accordance with a predetermined cooling strategy.

9. A method as claimed in claim 1 in which the material comprises a polymer selected from the group consisting of PVC, PVC/PVC and PAN.

10. A method as claimed in claim 1 in which the material comprises a combination of amorphous and crystalline polymers.

11. An article manufactured in accordance with the method of of claim 1.

12. An article comprising a hot compaction of amorphous polymer material wherein the structure of said article comprises cores of amorphous polymer surrounded by a mass of softened and re-hardened material which bonds the cores together.

13. A method as claimed in claim 1 wherein said polymer elements comprise a molecularly oriented amorphous polymer and the said structure comprises cores of oriented amorphous polymer that have not been softened or melted in the method and retain their orientation, surrounded by a mass of softened and re-hardened material which bonds the cores together.

14. An article as claimed in claim 12 wherein the structure of the said article comprises cores of molecularly oriented amorphous polymer surrounded by a mass of softened and re-hardened material which bonds the cores together.

15. A method as claimed in claim 9 in which the material is PVC.

16. A method as claimed in claim 1 wherein the said raw material is provided in the form of a plurality of polymer elements said polymer elements consisting of an amorphous polymer.

* * * * *